US008818704B2

(12) United States Patent
Lee et al.

(10) Patent No.: US 8,818,704 B2
(45) Date of Patent: Aug. 26, 2014

(54) NAVIGATION SYSTEM WITH ROAD OBJECT DETECTION MECHANISM AND METHOD OF OPERATION THEREOF

(75) Inventors: Shane-Woei Lee, Fremont, CA (US); Ryan Robert Peterson, Seattle, WA (US)

(73) Assignee: Telenav, Inc., Sunnyvale, CA (US)

(\*) Notice: Subject to any disclaimer, the term of this patent is extended or adjusted under 35 U.S.C. 154(b) by 177 days.

(21) Appl. No.: 13/369,203

(22) Filed: Feb. 8, 2012

(65) Prior Publication Data

US 2012/0143489 A1  Jun. 7, 2012

Related U.S. Application Data

(63) Continuation-in-part of application No. 12/907,025, filed on Oct. 18, 2010, now Pat. No. 8,467,956.

(51) Int. Cl.
*G01C 21/26* (2006.01)
*G08G 1/0962* (2006.01)
*G01C 21/36* (2006.01)
*G08G 1/16* (2006.01)

(52) U.S. Cl.
CPC ............ *G01C 21/3658* (2013.01); *G08G 1/161* (2013.01); *G08G 1/167* (2013.01); *G08G 1/165* (2013.01); *G08G 1/166* (2013.01); *G08G 1/164* (2013.01)
USPC .......................... 701/400; 701/33.4; 701/521

(58) Field of Classification Search
None
See application file for complete search history.

(56) References Cited

U.S. PATENT DOCUMENTS

| 5,862,511 | A | 1/1999 | Croyle et al. |
| 6,308,134 | B1 | 10/2001 | Croyle et al. |
| 6,484,089 | B1 * | 11/2002 | Millington ..................... 701/500 |
| 6,510,373 | B2 | 1/2003 | Grossardt et al. |
| 7,113,866 | B2 | 9/2006 | Taliwal |
| 7,117,076 | B2 | 10/2006 | Shimakage et al. |
| 7,421,334 | B2 * | 9/2008 | Dahlgren et al. ............. 701/117 |
| 7,529,609 | B2 | 5/2009 | Braunberger et al. |
| 7,705,748 | B2 | 4/2010 | Fu |
| 2003/0088355 | A1 * | 5/2003 | Fuhrer et al. .................... 701/93 |
| 2004/0236475 | A1 | 11/2004 | Chowdhary |
| 2006/0030987 | A1 | 2/2006 | Akita |
| 2007/0032943 | A1 | 2/2007 | Okabe |
| 2007/0080825 | A1 | 4/2007 | Shiller |
| 2007/0255474 | A1 | 11/2007 | Hayakawa et al. |
| 2008/0167819 | A1 | 7/2008 | Breed |
| 2008/0172153 | A1 | 7/2008 | Ozaki et al. |
| 2008/0183419 | A1 | 7/2008 | Cong et al. |
| 2009/0192688 | A1 | 7/2009 | Padmanabhan et al. |
| 2009/0312946 | A1 | 12/2009 | Yoshioka et al. |

(Continued)

FOREIGN PATENT DOCUMENTS

WO   WO2006/054976 A1 *  5/2006

OTHER PUBLICATIONS

International Search Report for Application No. PCT/US2011/053077 dated Feb. 16, 2012.

*Primary Examiner* — Michael J Zanelli
(74) *Attorney, Agent, or Firm* — IP Investment Law Group

(57) ABSTRACT

A method of operation of a navigation system includes: determining a road object detection for monitoring a movement of a device; determining a travel state based on the road object detection; identifying a travel sequence involving the travel state; and determining a condition inducing movement based on matching the travel sequence to a predetermined sequence for displaying on the device.

20 Claims, 11 Drawing Sheets

(56) References Cited

U.S. PATENT DOCUMENTS

| | | | |
|---|---|---|---|
| 2010/0211249 A1* | 8/2010 | McClellan | 701/29 |
| 2010/0253597 A1 | 10/2010 | Seder et al. | |
| 2010/0256903 A1 | 10/2010 | Johnson | |
| 2012/0053805 A1* | 3/2012 | Dantu | 701/70 |

\* cited by examiner

NAVIGATION SYSTEM WITH ROAD OBJECT DETECTION MECHANISM AND METHOD OF OPERATION THEREOF

CROSS-REFERENCE TO RELATED APPLICATION(S)

This is a continuation-in-part of co-pending U.S. patent application Ser. No. 12/907,025 filed Oct. 18, 2010.

TECHNICAL FIELD

The present invention relates generally to a navigation system, and more particularly to a system for detecting movements.

BACKGROUND ART

Modern portable consumer and industrial electronics, especially client devices such as navigation systems, smart phones, portable digital assistants, and combination devices are providing increasing levels of functionality to support modern life including location-based information services. Research and development in the existing technologies can take a myriad of different directions.

As users become more empowered with the growth of mobile navigation service devices, new and old paradigms begin to take advantage of this new device space. There are many technological solutions to take advantage of this new device-location opportunity. One existing approach is to use location information to locate the user and guide the user to a destination.

Often, the granularity for detecting the movement is too coarse to detect movements within the road. Other times, the circumstances and the environment can degrade the accuracy in locating the user.

The need to reduce costs, improve efficiencies and performance, and meet competitive pressures adds an even greater urgency to the critical necessity for finding answers to these problems. However, solutions to these problems have been long sought but prior developments have not taught or suggested any solutions and, thus, solutions to these problems have long eluded those skilled in the art. Thus, a need still remains for a navigation system with lane-level mechanism.

DISCLOSURE OF THE INVENTION

The present invention provides a method of operation of a navigation system including: determining a road object detection for monitoring a movement of a device; determining a travel state based on the road object detection; identifying a travel sequence involving the travel state; and determining a condition inducing movement based on matching the travel sequence to a predetermined sequence for displaying on the device.

The present invention provides a navigation system, including: a detecting sensor for determining a road object detection for monitoring a movement of a device; a mode determination module, coupled to the detecting sensor, for determining a travel state based on the road object detection; a sequence module, coupled to the mode determination module, for identifying a travel sequence involving the travel state; and a movement determination module, coupled to the sequence module for determining a condition inducing movement based on matching the travel sequence to a predetermined sequence for displaying on the device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
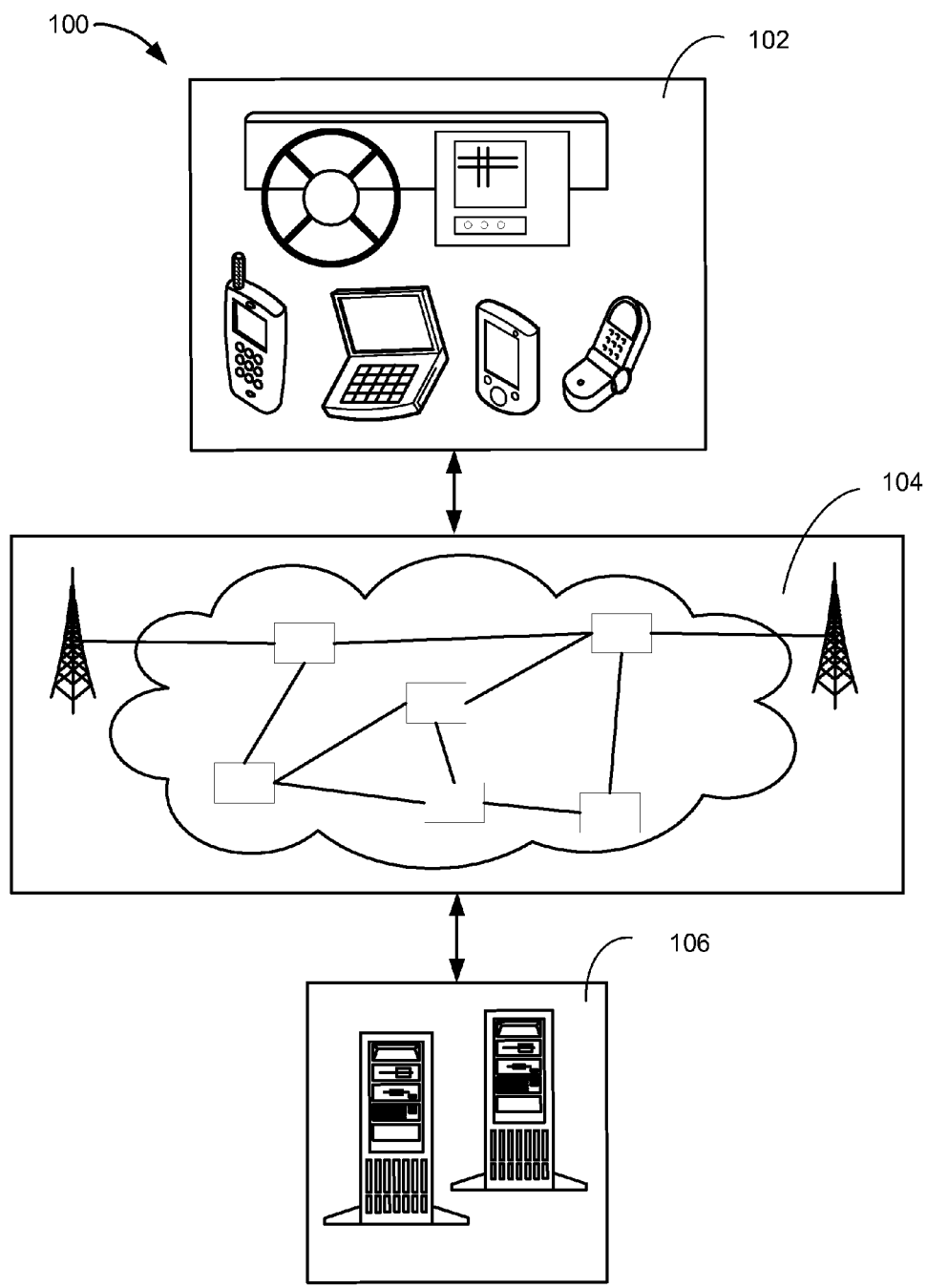
FIG. 1 is a navigation system with road object detection mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system, passive devices, or a combination thereof.

Referring now to FIG. 1, therein is shown a navigation system 100 with road object detection mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10 Business Class mainframe or a HP ProLiant ML server. Yet another example, the second device 106 can be a particularized machine, such as a portable computing device, a thin client, a notebook, a netbook, a smartphone, personal digital assistant, or a cellular phone, and as specific examples, an Apple iPhone, Palm Centro, or Moto Q Global.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard, wireless fidelity, and worldwide interoperability for microwave access are examples of wireless communication that can be included in the communication path 104. Ethernet, digital subscriber line, fiber to the home, and plain old telephone service are examples of wired communication that can be included in the communication path 104.

Further, the communication path 104 can traverse a number of network topologies and distances. For example, the communication path 104 can include direct connection, personal area network, local area network, metropolitan area network, wide area network or any combination thereof.

Figure 2A:
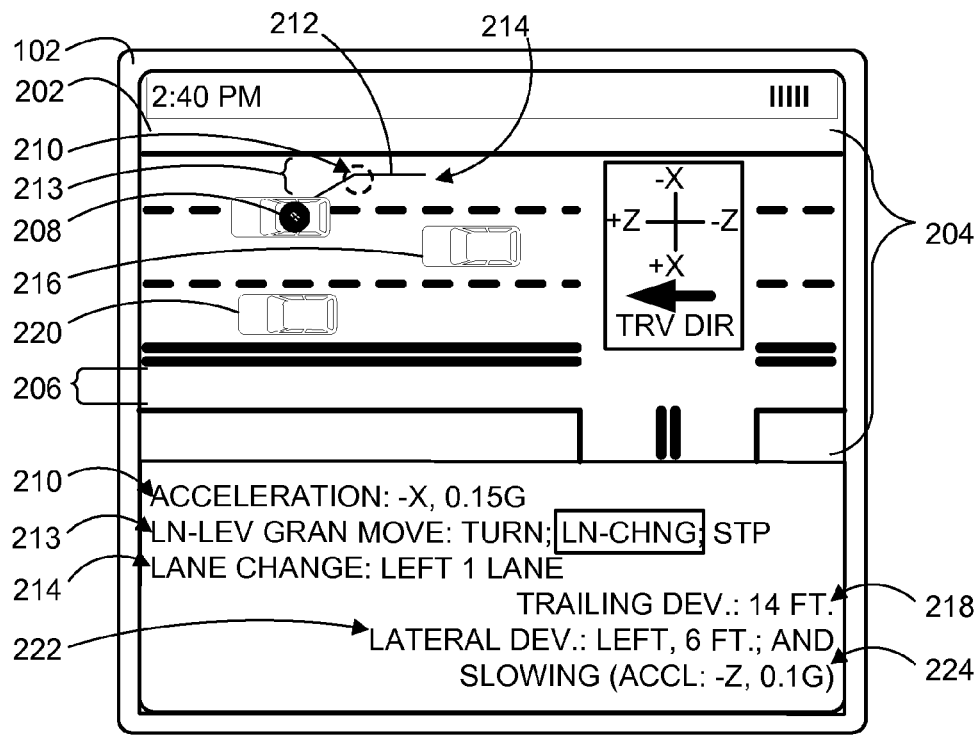
FIG. 2A is a first example of a display interface of the first device.

Referring now to FIG. 2A, therein is shown a first example of a display interface 202 of the first device 102. The display interface 202 can show a map 204, a lane 206, and a device-location 208.

The map 204 is a representation of a geographic area. For example, the map 204 can represent a layout of a city visually or represent an intersection with a series of written or audible coordinates, such as global positioning system (GPS) coordinates or longitude and latitude, of entities that make up the intersection. For example, the map 204 can include roads, the lane 206 on the roads, intersections, highways, highway ramps, buildings or entities, landmarks, or a combination thereof.

The lane 206 is a division of a road and is intended to separate single lines of traffic. The lane 206 can be represented by lines or dashes of different colors or simply by the different flow of traffic without line demarcation. For example, the lane 206 can be the space on the road between the yellow solid line and dashed white lines. The lane 206 can also be represented using the boundaries of surrounding entities. For example, the lane 206 can be the space between two parallel building outlines or two rooms.

The device-location 208 is the geographical location of the first device 102. The device-location 208 can be represented in multiple ways. For example, the device-location 208 can be a set of coordinates, such as GPS coordinates or longitude and latitude. Continuing with the example, the device-location 208 can be an address or a set of landmarks, such as the intersection of two roads or a highway exit.

The device-location 208 can also be represented relative to known landmarks. For example, the device-location 208 can be 5 miles north and 2 miles west of the user's home or 100 feet past the First Street exit on Highway 1, in the second lane from right.

The device-location 208 can also be represented relative to known location. For example, the device-location 208 can be the determined geographical location of the first device 102. The device-location 208 can be determined based on the last known or verified location, such as last known GPS coordinate or the user's house. The device-location 208 can be determined by tracking the movement of the first device 102. The details of determining the device-location 208 based on the last known or verified location will be discussed below.

The display interface 202 can also show the current situation or movement of the user. The display interface 202 can show an acceleration 210, a travel path 212, a lane-level granularity movement 213, and a lane-change 214.

The acceleration 210 is an increase in the rate or speed along a direction or a change in direction. The navigation system 100 can determine the acceleration 210 of the first device 102. The method for determining the acceleration 210 will be discussed below. The acceleration 210 is depicted both textually and where the user moves left.

The acceleration 210 can be represented as a function of time and velocity, a force, or a combination therein. For example, the acceleration 210 can be denoted as 0-60 miles-per-hour in 6 seconds or as 0.1 g, where 1 g is the gravitational force of the earth.

The acceleration 210 can include the direction. The direction is the line or course along which a person or thing moves. For example, the direction can be left or along the x-axis.

Directions can be represented in relation to the user. Directions can be a set such as left, right, forward, back, up, and down. Directions can also be a set where negative x direction would be equivalent to right, positive z direction would be forward, and positive y direction would be up, as depicted. The polarity and the variable assigned to each direction can be different. For example, forward can be +z, left can be −x, and up can be +y.

Along with change in speed, a change in direction can constitute the acceleration 210. For example, the acceleration 210 for the vehicle accelerating forward 10 miles-per-hour each second can be 10 m/h/s forward and slowing down 10 miles-per-hour each second can be 10 m/h/s in the −z direction. Also, for example, a plane maneuvering left can be denoted as −5 g along the x-axis.

The travel path 212 is the set of locations where the first device 102 was during a period of time. The travel path 212 can be a route that the user travelled. For example, the travel path 212 can be the route the user took to get from one point to another. Also for example, the travel path 212 can be a vehicle's movement and locations during the past 5 minutes.

The lane-level granularity movement 213 is the movement of the first device 102 described at a granularity sufficient to detect movements in relation to the lane 206. For example, the lane-level granularity movement 213 can include the lane-change 214, turn, or sudden stop. The lane-level granularity movement 213 is depicted both textually and where the user moves within the lane 206.

The lane-change 214 is the act of moving from one lane to another. The vehicle or the first device 102 travelling in the lane 206 can execute the lane-change 214 by moving do a different lane. The lane-change 214 is different from a turn in that the vehicle or the first device 102 performing the lane-change 214 will continue to follow the direction of the road or path. When the vehicle or the first device 102 executes a turn, the direction of travel will change from before the turn.

For example, a vehicle travelling west bound on a 3-lane road can execute the lane-change 214 by moving from the left lane to the right lane and continuing to travel west. The vehicle can execute a right turn by leaving the west bound road and going north on a different road. The lane-change 214 is depicted both textually and where the user moves from one lane to the lane one the left.

The display interface 202 can also show the surrounding environment of the user. The display interface 202 can show a first vehicle 216, a first-vehicle location 218, a second vehicle 220, a second-vehicle location 222, and a second-vehicle movement 224.

The first vehicle 216 is depicted as a vehicle that is travelling behind the first device 102 in the same lane. The first vehicle 216 can move in behind the user, into the lane 206 that the user is travelling in. The first vehicle 216 can move out of the lane 206 that the user is travelling.

The first-vehicle location 218 is the location of the first vehicle 216 that is moving behind the user in the lane 206 identical to the user. The first-vehicle location 218 can be the coordinates, such as the GPS or longitude-latitude coordinates or the distance away from the first device 102, of the first vehicle 216.

The second vehicle 220 is depicted as a vehicle that is travelling next to the first device 102. The second vehicle 220 can be the vehicle that is travelling on the same road, in the same direction as the user, and in a predetermined area relative to the first device 102.

The predetermined area is designated using distance, angle, lanes, or a combination thereof. For example, the predetermined area for evaluating the second vehicle 220 can be defined as the two adjacent lanes on each side of the first device 102 and up to 26 feet to the front and up to 3 car lengths behind the first device 102. Also, for example, the predetermined area can be a zone that starts 45 degrees away from the direction of travel and covering 90 degrees, from 45 degrees to 135 degrees away from the direction of travel, around the first device 102.

The area for determining the second vehicle 220 can be predetermined by the user, the navigation system 100, the software manufacturer, or a combination thereof. The details of determining the second vehicle 220 will be discussed below.

The second-vehicle location 222 is the location of the second vehicle 220. The first-vehicle location 218 can be the coordinates of the second vehicle 220, such as the GPS or longitude-latitude coordinates, or the distance away from the first device 102.

The second-vehicle movement 224 is the movement of the second vehicle 220. The second-vehicle movement 224 can be the acceleration 210 of the second vehicle 220. For example, if the second vehicle 220 is veering slightly left, the second-vehicle movement 224 can be −0.1 gX. The second-vehicle movement 224 can also be the lane-change 214 performed by the second vehicle 220.

Figure 2B:
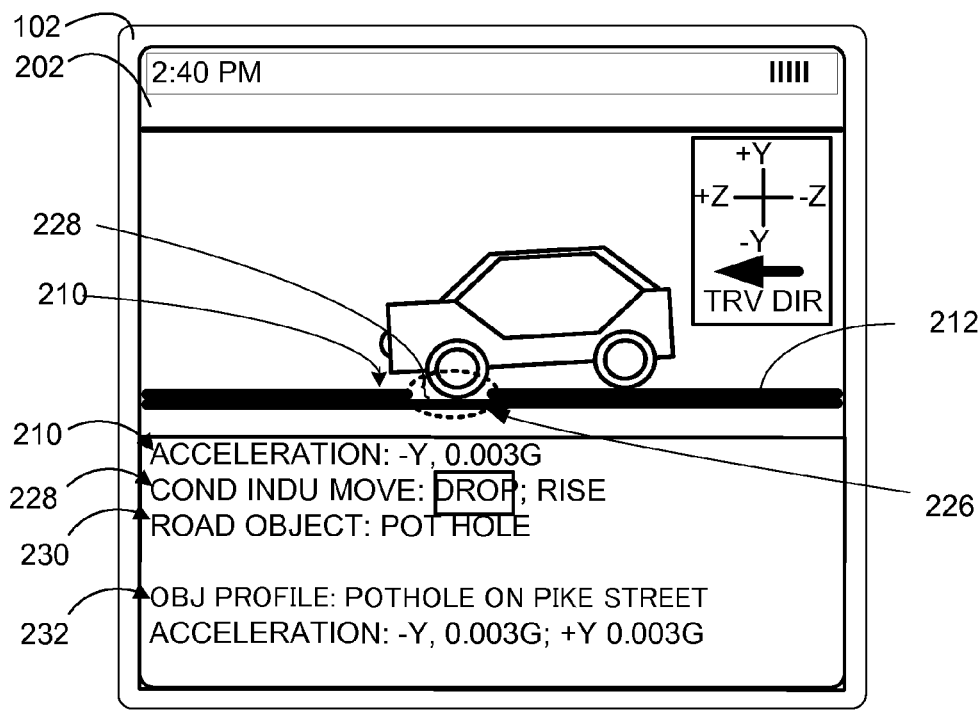
FIG. 2B is a second example of the display interface of the first device.

Referring now to FIG. 2B, therein is shown a second example of the display interface 202 of the first device 102. The display interface 202 can show a vehicle with the navigation system 100 on the first device 102 traveling over a road object 226.

The road object 226 is defined as an object existing on the travel path 212 that induces a condition inducing movement 228 to the navigation system 100. For example, the road object 226 can include a pothole, an animate object, an inanimate object, a speed bump, or a combination thereof.

By the vehicle with the navigation system 100 traveling over the road object 226, the road object 226 can induce the condition inducing movement 228. The condition inducing movement 228 is defined as the acceleration 210 of the first device 102 caused by the road object 226 while traveling over the road object 226. For example, the condition inducing movement 228 can include a road object detection 230, which is defined as the identification of the road object 226 by the navigation system 100 contacting the road object 226.

For specific example, the vehicle with the first device 102 can travel along the travel path 212 representing a street in a city. The travel path 212 can include the road object 226 representing a pothole. The vehicle can make contact with the pothole when the vehicle travels over the pothole. Based on the contact with the road object 226, the acceleration 210 representing a downward movement of the first device 102 can be induced. For a specific example, the acceleration 210 can be denoted as 0.003 g of negative y direction along the y-axis. Based on the acceleration 210 of −0.003 g of y direction, the navigation system 100 can determine the road object detection 230 to be a pothole. Details regarding the determination of the road object detection 230 will be discussed later.

An object profile 232 is defined as the description of the road object 226. For example, the navigation system 100 can generate each of the object profile 232 detected by the navigation system 100. Details regarding the generation of the object profile 232 will be discussed later.

Figure 3:
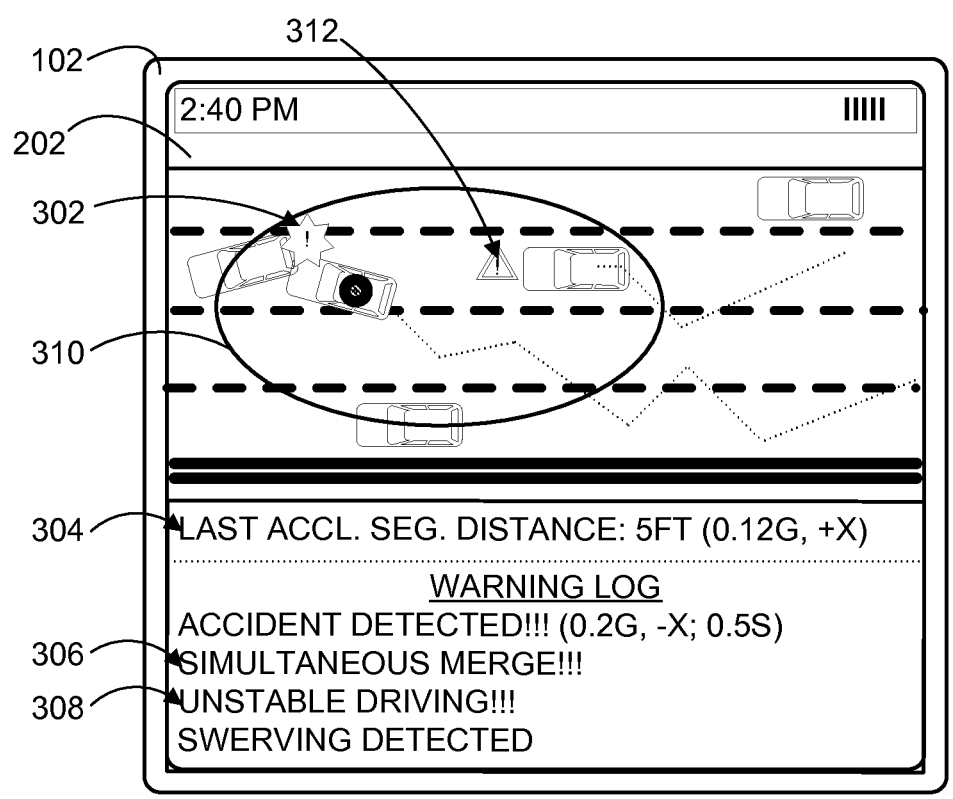
FIG. 3 is a third example of the display interface of the first device.

Referring now to FIG. 3, therein is shown a third example of the display interface 202 of the first device 102. The display interface 202 can show a traffic accident 302, a movement displacement 304, a simultaneous merge 306, an unstable-driving status 308, a peer-to-peer communication zone 310, and a stop warning 312.

The traffic accident 302 is an unexpected and undesirable event that occurs while the user is traversing. The traffic accident 302 can be a collision, a malfunction in the vehicle, or a combination thereof. For example, the traffic accident 302 can be the user's vehicle colliding with another vehicle or a stationary object, such as a tree or a building, or running over a large pothole. Also, for example, the traffic accident 302 can be the collapse of the bridge the user was on or the user slipping and falling on a patch of ice.

The movement displacement 304 is the distance that the first device 102 travels while it is accelerating. The movement displacement 304 can be in the direction of the acceleration 210 of FIG. 2A, and the movement displacement 304 can be determined over a given time span. For example, if a vehicle steadily accelerates to 10 mph over an hour, the movement displacement 304 would be the 5 miles the vehicle travelled during that hour. The distance traveled during the acceleration 210 is the magnitude of the movement displacement 304. The movement displacement 304 is the distance with the direction component of the acceleration 210. The details of calculating the movement displacement 304 will be discussed below.

The simultaneous merge 306 is the situation where two entities simultaneously try to merge into the same lane. For example, the simultaneous merge 306 can be when one car executes the lane-change 214 of FIG. 2A while another car is executing the lane-change 214 into the same lane. Also, for example, the simultaneous merge 306 can occur when two ships try to merge into a shipping lane at the same time.

The unstable-driving status 308 is a status that indicates erratic or irregular driving pattern. The unstable-driving status 308 can indicate driving patterns that are typical for intoxicated or sleepy drivers. For example, if a car is weaving within a lane, the unstable-driving status 308 can indicate irregular driving pattern, which can be used to avoid or report a possibly sleepy or drunk driver. Also, for example, if a vehicle is speeding, the unstable-driving status 308 can indicate speeding. The unstable-driving status 308 can be a sound, movement, display, or a combination thereof that communicates the unstable-driving pattern.

The peer-to-peer communication zone 310 is an area in which one device or entity can communicate directly to another device or entity. The first device 102 can communicate directly with other device or entity within the peer-to-peer communication zone 310.

The peer-to-peer communication zone 310 can be a circular area around the first device 102 defined by a fixed radius, such as 3 feet or 1 mile. The peer-to-peer communication zone 310 can also be a fixed geographical unit, such as within the same city block or within the highway segment. The peer-to-peer communication zone 310 can be determined by the user, the navigation system 100, the software manufacturer, or a combination thereof.

The peer-to-peer communication zone 310 can also be determined by the distance that the first device 102 can send messages for peer-to-peer communication. The peer-to-peer communication zone 310 can be a function of the transmitting capability or the receiving capability of the first device 102.

The stop warning 312 is a warning that states that a person or a vehicle should stop their current travel. For example, when the user is involved in the traffic accident 302 or makes a sudden stop, the stop warning 312 can be sent to the first vehicle 216 of FIG. 2A that is within the peer-to-peer communication zone 310. The stop warning 312 can notify the operator of the first vehicle 216 that the first vehicle 216 can avoid colliding into the user. The stop warning 312 can be a sound, movement, display, signal, or a combination thereof that can be used to warn a person or entity.

Figure 4A:
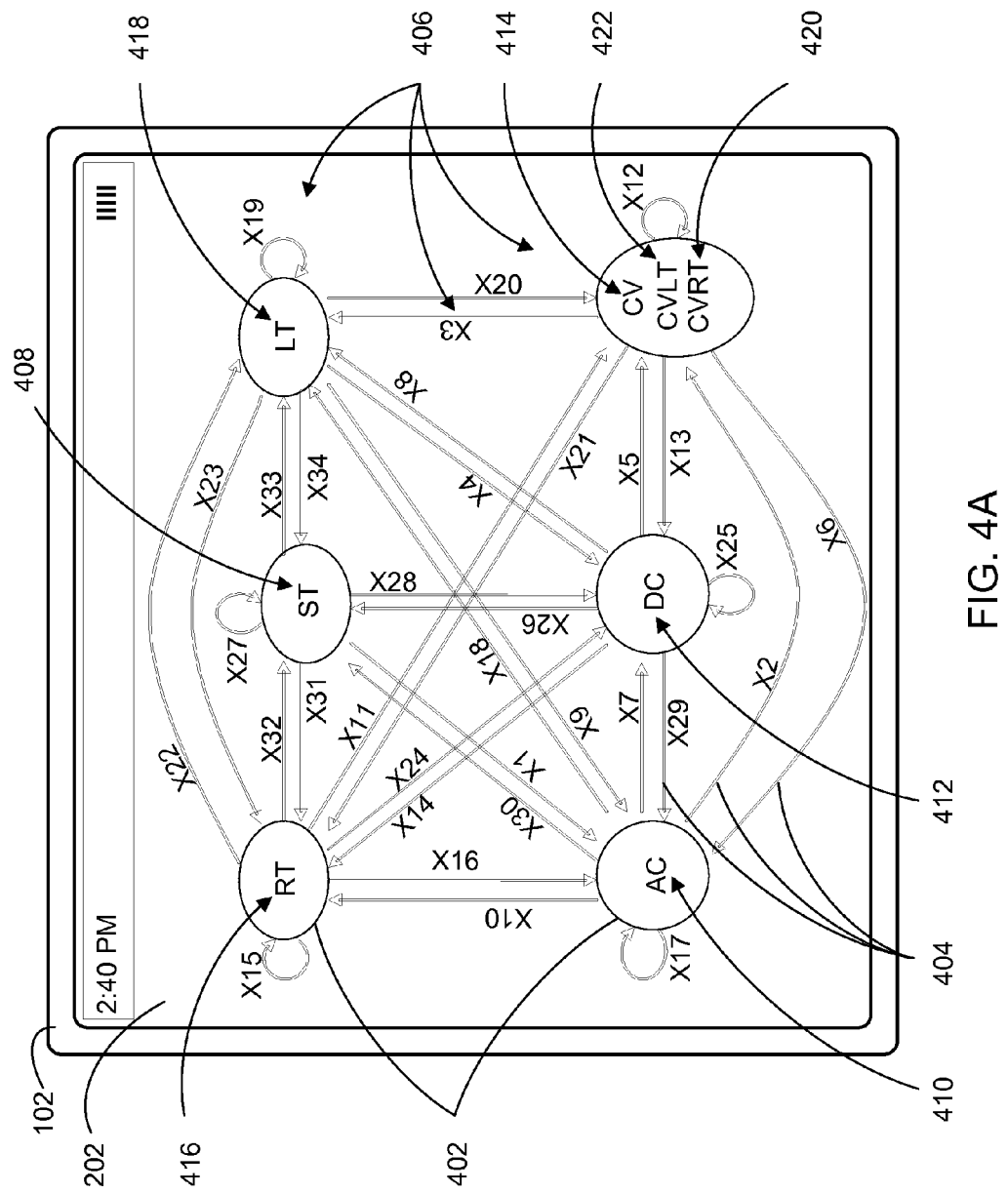
FIG. 4A is a fourth example of the display interface of the first device.

Referring now to FIG. 4A, therein is shown a fourth example of the display interface 202 of the first device 102. The display interface 202 can display a travel state 402, a state change condition 404, and a state-path name 406. This fourth example depicts a state transition diagram of the navigation system 100 in a diagnostic mode, as an example. The diagnostic mode can be brought up in the first device 102, the second device 106 of FIG. 1, or both.

The travel state 402 is a current mode or condition during the user's travel as indicated by the movement of the first device 102. For example, the travel state 402 can be acceleration, slowing down, stop, turn, constant velocity, or a combination thereof.

The navigation system 100 can detect or determine the travel state 402. The navigation system 100 can determine the travel state 402 using the state change condition 404. The state change condition 404 is the circumstance or factors that can change the travel state 402. For example, the state change condition 404 necessary for a stop state can be when the velocity is zero. Also, for example, the state change condition 404 necessary for a constant velocity state is when the velocity is detected or at the end of the acceleration 210 of FIG. 2A.

The state-path name 406 is the name, the label, or the designation given to a transition between states. The state-path name 406 can be a letter, number, symbol, or a combination thereof that indicates a certain transition between two states. For example, a path 1 or X1 can represent the transition from an initial or stopped state to moving state. The change in state described by path 1 can occur when the state change condition 404 of acceleration in the positive z-axis greater than 0.1 g is met.

The state-path name 406 can also be a description of the change between one of the travel state 402 and a further one of the travel state 402. For example, "slowing down" or "reducing speed" can represent the transition between a constant speed state to a reducing speed state.

The display interface 202 can also display the various states that can be assigned to the travel state 402 using the state change condition 404 and the state-path name. The display interface 202 can display the travel state 402 as a static state 408, an acceleration state 410, a deceleration state 412, a constant velocity state 414, a right turn state 416, a left turn state 418, a steady right state 420, and a steady left state 422.

The static state 408 is where the subject, such as a person, thing, or the first device 102, is stopped with zero velocity. The travel state 402 can be the static state 408 when the first device 102 is first initialized or when the velocity of the first device is zero. The travel state 402 can also be the static state 408 when a series of acceleration, velocity, and deceleration matches the predetermined series of movements or activities that define the static state 408.

The travel state 402 can be the acceleration state 410 when the first device 102 is changing velocity as in changing the speed, the direction of travel, or a combination of both. The travel state 402 can be the acceleration state 410 when the subject is initially in the static state 408 and the acceleration 210 is greater than 0.1 g. For example, the acceleration state 410 can also occur when there is a change in velocity.

The travel state 402 can be the acceleration state 410 when the subject, such as a vehicle or a person, changes the direction of travel and maintains the same speed. For example, ship travelling at a constant speed can turn to port at a rate where the acceleration 210 would be 0.05 g in the −x direction.

The travel state 402 can be the deceleration state 412 when the subject is decreasing velocity. The travel state 402 can be the deceleration state 412 when the speed is being reduced, such as when a car comes to a stop. For example, the travel state 402 can be the deceleration state 412 the subject is initially travelling at a constant speed and the acceleration 210 is less than −0.1 g along the z-axis.

The travel state 402 can be the constant velocity state 414 when the subject maintains the same speed and direction. The constant velocity state 414 can be when the car is steadily travelling at 60 mph on a flat road, while the car travels straight forward. For example, the constant velocity state can be when the acceleration 210 is zero following the acceleration state 410.

The travel state 402 can be the right turn state 416 when the subject changes the direction of travel to the right, parallel to a road different from the one that the subject was travelling on. For example, the travel state 402 can be the right turn state 416 can occur when a car moves from a road to another road that is perpendicular to the first road by executing a 90-degree turn to the right. Also, for example, the right turn state 416 can be when the acceleration 210 is greater than +0.1 g along the x-axis for at least 2 seconds. The left turn state 418 is similar to the right turn state 416 but in the opposite direction.

The steady right state 420 is where the subject maintains the acceleration 210 to the right, or the +x direction while maintaining the speed. The steady right state 420 can occur when the subject veers to the right, incongruent to the road. For example, the steady right state 420 can be when the user maintains speed and moves to the right on a straight road. The steady right state 420 can be the state where the state change condition 404 for both the constant velocity state 414 and the right turn state 416 are met.

The steady left state 422 is similar to the steady right state 420 but in the opposite direction. The steady left state 422 can be when the subject veers to the left, incongruent to the road. The steady left state 422 can be the state where the state change condition 404 for both the constant velocity state 414 and the left turn state 418 are met.

Figure 4B:
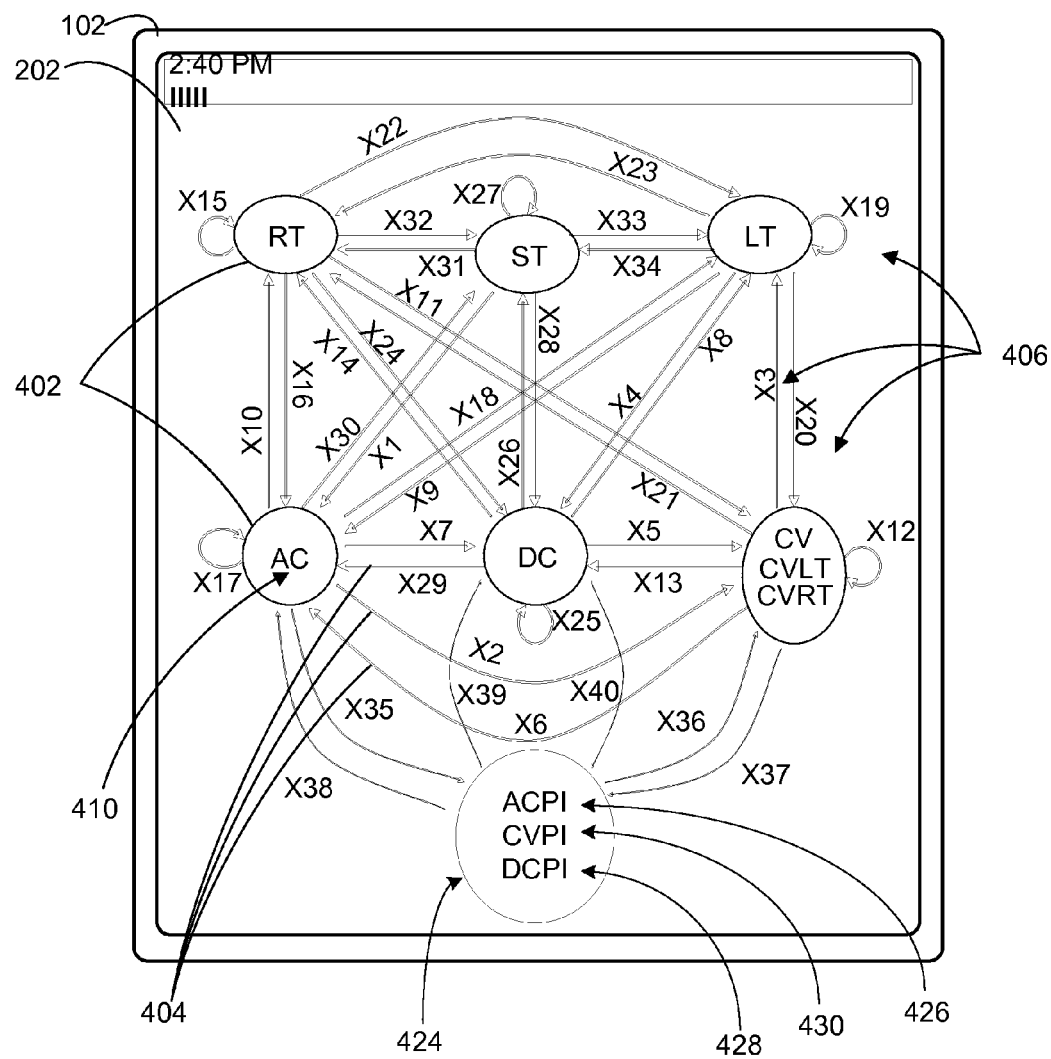
FIG. 4B is a fifth example of the display interface of the first device.

Referring now to FIG. 4B, therein is shown a fifth example of the display interface 202 of the first device 102. The fifth example can leverage the state diagram illustrated in FIG. 4A by including, for example, the travel state 402, the state change condition 404, and the state-path name 406. Additionally, the fifth example can illustrate the travel state 402 including an object detection state 424.

The object detection state 424 is defined as the travel state 402 after determining the road object detection 230 of FIG. 2B. For example, the object detection state 424 can include a speedup vertical state 426, a slowdown vertical state 428, and a constant velocity vertical state 430. Details regarding the determination of the road object detection 230 will be discussed later.

The speedup vertical state 426 is defined as the state when the travel state 402 includes the acceleration 210 of FIG. 2A in the direction of positive z-direction and positive or negative y-direction after contacting the road object 226 of FIG. 2B. For example, a vehicle with the navigation system 100 travelling along the travel path 212 of FIG. 2A can contact with the road object 226. The road object 226 can be a pothole. The travel state 402 for the vehicle can be in the acceleration state 410 representing a positive z-direction. While the vehicle is accelerating in the positive z-direction, the vehicle can contact the pothole for generating the acceleration 210 greater than 0.003 g in the direction of negative y-direction.

The slowdown vertical state 428 is defined as the state when the travel state 402 includes the acceleration 210 in the direction of negative z-direction and positive or negative y-direction after contacting the road object 226. Continuing with the previous example, while the vehicle is decelerating in the positive z-direction, the vehicle can contact the pothole for generating the acceleration 210 greater than 0.003 g in the direction of negative y-direction.

The constant velocity vertical state 430 is defined as the state when the travel state 402 includes the acceleration 210 of zero with a constant speed in the direction of positive z-direction and a positive or negative y-direction after contacting the road object 226. For example, the road object 226 can be a speed bump on the road. While the vehicle is travelling at a constant velocity in the positive z-direction, the vehicle can contact the speed bump for generating the acceleration 210 greater than 0.003 g in the direction of positive y-direction.

As described in FIG. 4A, the navigation system 100 can detect or determine the travel state 402 using the state change condition 404. For example, the state change condition 404 necessary for detecting the road object 226 can be when a vehicle with the first device 102 contacts the road object 226.

As described in FIG. 4A, the state-path name 406 can include X35, X36, X37, X38, X39, and X40 involving the object detection state 424. For example, X35 can represent a change in the state from the acceleration state 410 to the speedup vertical state 426 when the state change condition 404 of contacting the road object 226 is detected while in the acceleration state 410.

Figure 5A:
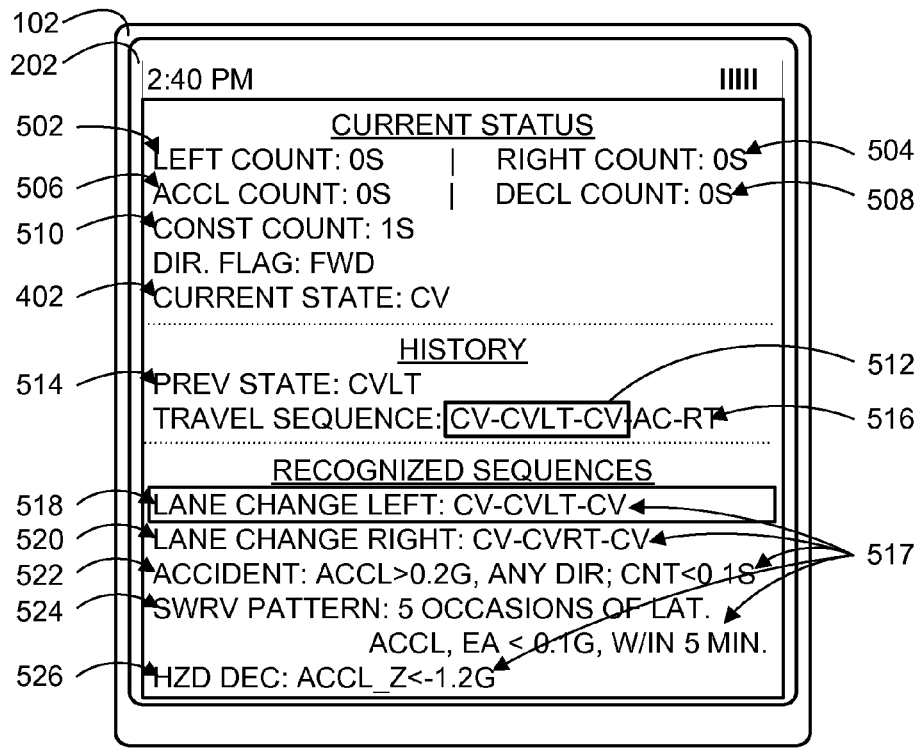
FIG. 5A is a sixth example of the display interface of the first device.

Referring now to FIG. 5A, therein is shown a sixth example of the display interface 202 of the first device 102. The display interface 202 can display a left count 502, a right count 504, an acceleration count 506, a deceleration count 508, and a constant count 510.

The left count 502, the right count 504, the acceleration count 506, and the deceleration count 508 is the duration in which the applicable acceleration has been occurring. For example, the left count 502 can be the number of clock cycles or sample periods that have elapsed while the acceleration 210 of FIG. 2A has been less than zero along the x-axis. Also, for example, the deceleration count 508 can be the number of seconds where the speed has been reducing or where the acceleration 210 has been negative along the z-axis.

The constant count 510 is the duration in which the velocity of a moving person or object has not changed. The constant count 510 can be the number of seconds or other regular periods, such as a system clock or sampling periods, during which the direction and the speed has remained steady. For example, the constant count 510 can be 15 clock cycles if the first device 102 has been maintaining 10 mph for 3 seconds and the device clock cycle is 5 Hz.

The display interface 202 can also display a sliding window 512, a previous state 514, a travel sequence 516, a predetermined sequence 517, a left shift sequence 518, a right shift sequence 520, an accident-sequence 522, a swerving pattern 524, and a hazardous deceleration 526.

The sliding window 512 is a set of slots that can be used to hold a segment of a larger sequential data in order. For example, the sliding window 512 can be used to hold a predetermined amount of bits for computing or travel states.

The sliding window 512 can be used to hold the sequence of travel states that correspond to the movement of the first device 102. The first slot in the sliding window 512 can hold the travel state 402. The second slot in the sliding window 512 can hold the previous state 514. The length of, or the number of slots in the sliding window 512 can be predetermined by the user, the navigation system 100, the software manufacturer, the hardware manufacturer, or a combination thereof.

The previous state 514 is the state that occurred immediately before the travel state 402 of FIG. 4. For example, if the first device 102 was stopped at a traffic light and is now accelerating, the previous state 514 can be the static state 408 of FIG. 4 and the travel state 402 can be the acceleration state 410 of FIG. 4.

The travel sequence 516 is the sequence of states that include the travel state 402 and the states that occurred before the travel state 402. The travel sequence 516 can be the travel state 402 and the previous state 514. The travel sequence 516 can also start from the previous state 514 and contain a predetermined number of previously-occurring states in sequence. The number of states making up the travel sequence 516 and the sequential order, such as most recent to least recent, can be predetermined by the user, the navigation system 100, the software manufacturer, or a combination thereof.

The predetermined sequence 517 is a sequence of states, the acceleration 210, or a combination thereof that signifies the lane-level granularity movement 213. The predetermined sequence 517 can be the sequence of states and movements that occur during the lane-level granularity movement 213.

The predetermined sequence 517 can be a sequence of the state, such as the static state 408 of FIG. 4 or the deceleration state 412 of FIG. 4, the acceleration 210, or a combination thereof. For example, the predetermined sequence 517 can be the constant velocity state 414 of FIG. 4, the steady left state 422 of FIG. 4, and then the constant velocity state 414. Also, for example, the predetermined sequence 517 can be the acceleration 210 being less than −1.2 g along the z-axis.

The predetermined sequence 517 can be used to determine the lane-level granularity movement 213 by matching the predetermined sequence 517 to the movement of the first device 102. The details of the determination will be discussed below. The predetermined sequence 517 can be predetermined by the user, the navigation system 100, the software manufacturer, or a combination thereof.

The left shift sequence 518 is a sequence of states that signifies the lane-change 214 of FIG. 2A to the left. For example, the left shift sequence 518 can be a sequence consisting of the constant velocity state 414, the steady left state 422, and then the constant velocity state 414. When the travel sequence 516 matches the left shift sequence 518, the navigation system 100 can determine the lane-change 214 to the lane 206 of FIG. 2A on the left.

The right shift sequence 520 is similar to the left shift sequence 518 but in the opposite direction. For example, the right shift sequence 520 can be a sequence consisting of the constant velocity state 414, the steady right state 420 of FIG. 4, and then the constant velocity state 414. The details regarding the use of left and right shift sequences will be discussed below.

The accident-sequence 522 is a sequence of states or events that signifies the traffic accident 302 of FIG. 3. The accident-sequence 522 can be used to detect the traffic accident 302.

For example, the accident-sequence 522 for a car can be acceleration in any direction with magnitude greater than 0.3 g and lasting less than 0.5 seconds, signifying a movement that the car cannot normally make. The navigation system 100 can determine that the traffic accident 302 occurred when the navigation system 100 detects movement, event, the travel sequence 516, or a combination thereof matching the accident-sequence 522. The details regarding the use of the accident-sequence 522 will be discussed below.

The swerving pattern 524 is a sequence of states or events that signifies the subject is moving erratically or abnormally within a lane or a set of adjacent lanes. The swerving pattern 524 can be the path that a drunk or sleepy driver takes while driving.

Normal behavior for traversing within a lane is for the user or the vehicle to traverse on or near the center of the lane 206. Erratic or abnormal driving behavior is defined as when the user or the vehicle fails to travel on or near the center of the lane 206 and makes repeated course adjustments within the lane 206 to travel on or near the center of the lane 206. The erratic or abnormal driving behavior can also include moving out of the lane 206 but quickly turning back to travel on or near the center of the lane 206 before executing the lane-change 214.

The swerving pattern 524 can be defined to capture the erratic or abnormal driving behavior using a set of behavior. Using a set of behaviors or movements, the swerving pattern 524 can be used to distinguish between an incidental course adjustment or evasive maneuver and erratic or abnormal driving behavior.

The swerving pattern 524 can be a set of short lateral accelerations in opposing directions for a period of time. For example, the swerving pattern 524 can be a set of five or more accelerations left or right over a 5-minute period, each change in direction lasting less than 0.2 second. The navigation system 100 can use the swerving pattern 524 to identify potentially dangerous operators, such as intoxicated or sleepy drivers. The details regarding the use of the swerving pattern 524 will be discussed below.

The hazardous deceleration 526 is a drastic reduction in speed. The hazardous deceleration 526 can be defined as the acceleration 210 less than −0.2 g along the z-axis or deceleration greater than 5 mph/s. The navigation system 100 can use the hazardous deceleration 526 as a threshold for generating the stop warning 312 of FIG. 3. The details regarding the use of the hazardous deceleration 526 will be discussed below.

Figure 5B:
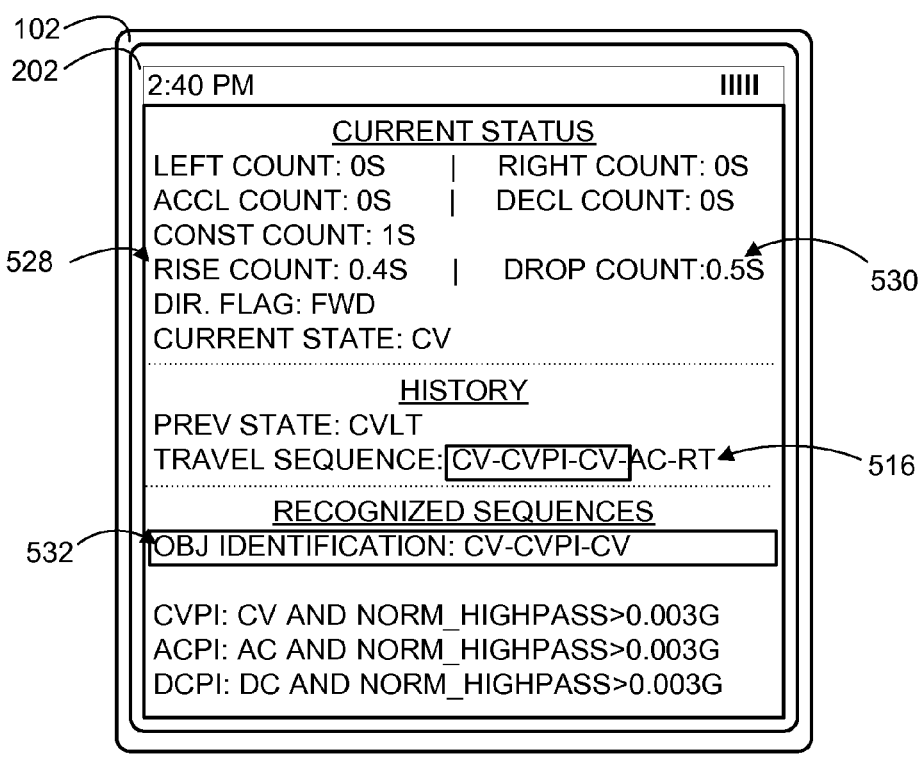
FIG. 5B is a seventh example of the display interface of the first device.

Referring now to FIG. 5B, therein is shown a seventh example of the display interface 202 of the first device 102. The display interface 202 can display a rise count 528 and a drop count 530. The rise count 528 is defined as the duration in which the acceleration 210 of FIG. 2A is occurring in the positive y direction. The drop count 530 is defined as the duration in which the acceleration 210 is occurring in the negative y direction.

For example, the rise count 528 can be the number of seconds where the acceleration 210 has been positive along the y-axis. In contrast, for example, the drop count 530 can be the number of seconds where the acceleration 210 has been negative along the y-axis.

The display interface 202 can display an object identification sequence 532. The object identification sequence 532 is defined as a sequence of states that signifies the road object detection 230 of FIG. 2B. For example, when the travel sequence 516 matches the object identification sequence 532, the navigation system 100 can determine the road object detection 230 for identifying the road object 226 of FIG. 2B. Details regarding the use of the object identification sequence 532 will be discussed later.

Figure 6:
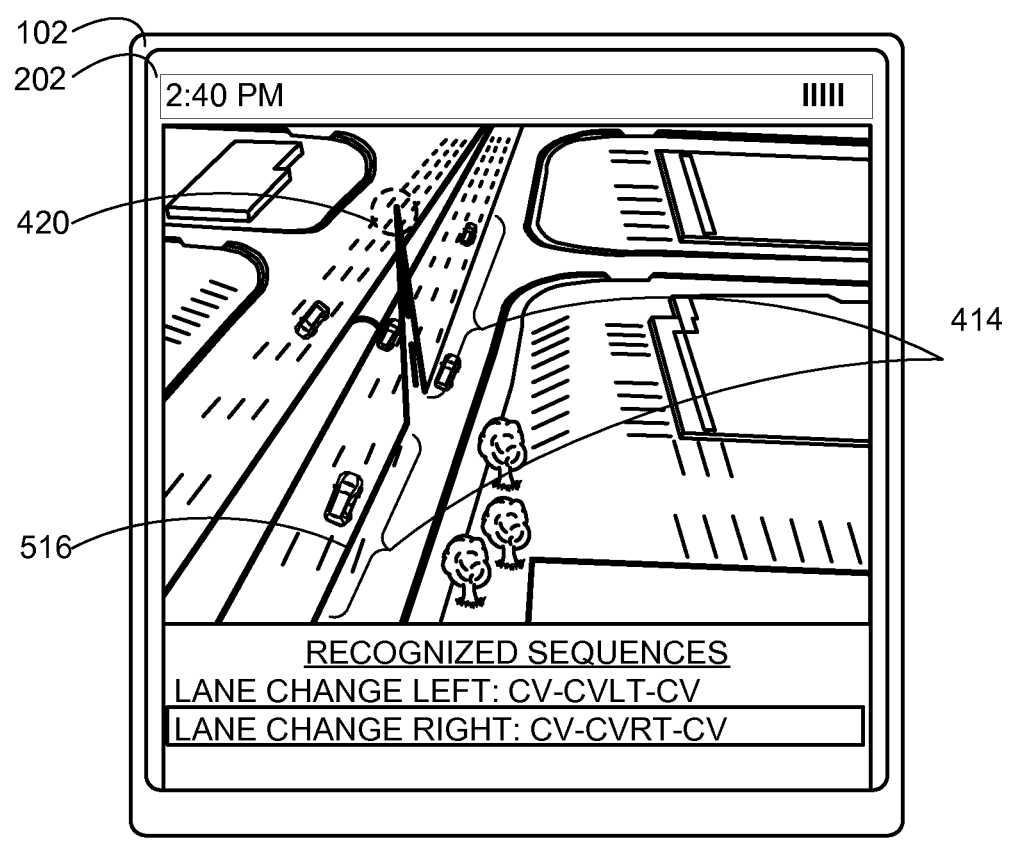
FIG. 6 is an eighth example of the display interface of the first device.

Referring now to FIG. 6, therein is shown an eighth example of the display interface 202 of the first device 102. The display interface 202 can display a graphical representation of the travel sequence 516. The travel sequence 516 is depicted as the constant velocity state 414-the steady right state 420-the constant velocity state 414. The travel sequence 516 is depicted as matching the predetermined sequence 517 of FIG. 5 defining the lane-change 214 of FIG. 2A to the right.

The travel sequence 516 is depicted using the Keyhole Markup Language (KML) format. The details of the use of the KML format will be discussed in detail below.

Figure 7:
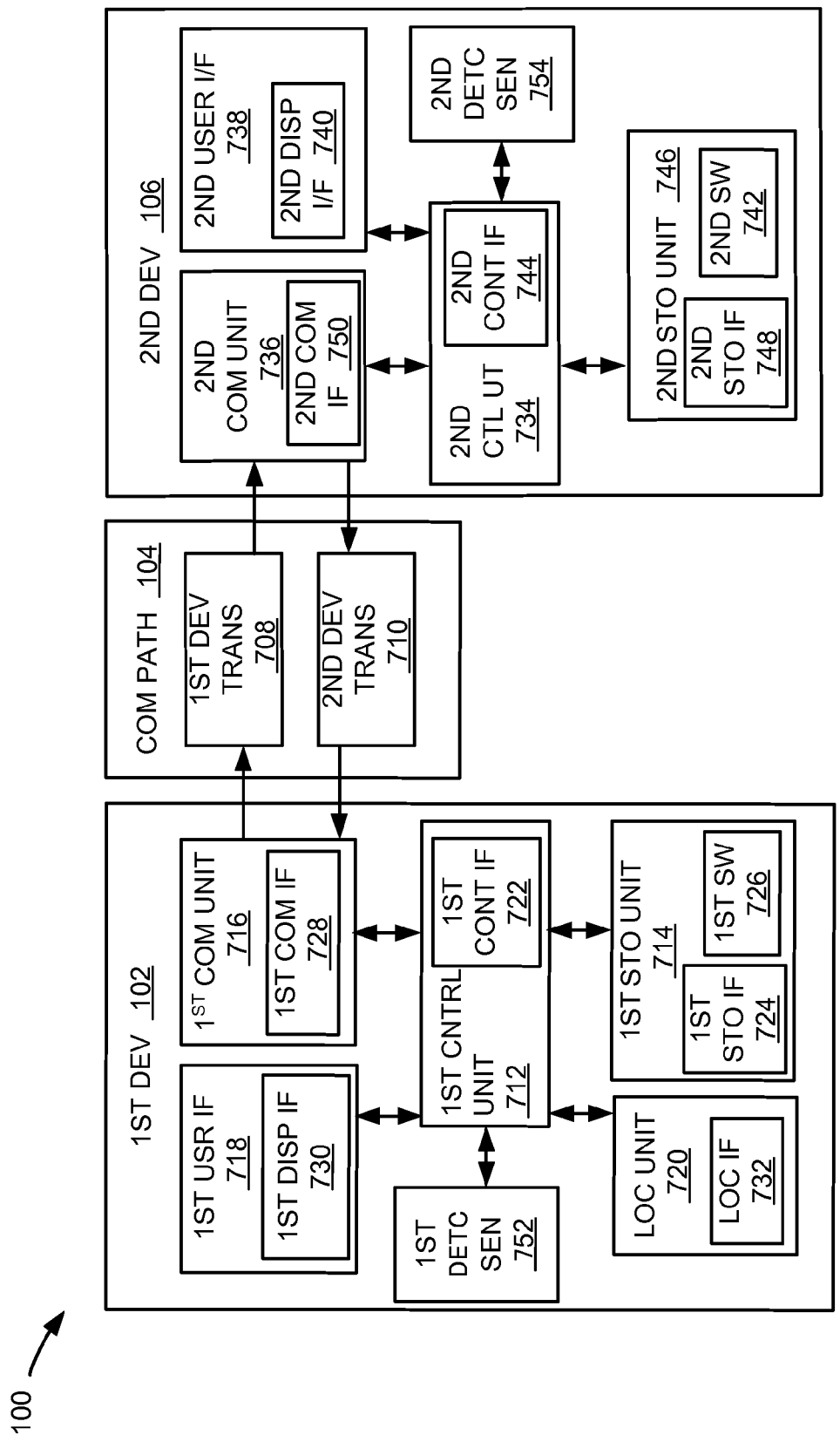
FIG. 7 is a first exemplary block diagram of the navigation system.

Referring now to FIG. 7, therein is shown a first exemplary block diagram of the navigation system 100. The navigation system 100 can include the first device 102, the communication path 104, and the second device 106.

The first device 102 can communicate with the second device 106 over the communication path 104. For example, the first device 102, the communication path 104, and the second device 106 can be the first device 102 of FIG. 1, the communication path 104 of FIG. 1, and the second device 106 of FIG. 1, respectively. The screen shot shown on the display interface 202 described in FIG. 2A and FIG. 2B can represent the screen shots for the navigation system 100.

The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first device 102 can be similarly described by the first device 102. The first control unit 712 can include a first control interface 722. The first storage unit 714 can include a first storage interface 724.

The first control unit 712 can execute a first software 726 to provide the intelligence of the navigation system 100. The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 of FIG. 1 via the first communication unit 716.

The first control unit 712 can be implemented in a number of different manners. For example, the first control unit 712 can be a processor, an embedded processor, a microprocessor, a hardware control logic, a hardware finite state machine, a digital signal processor, or a combination thereof.

The first control unit 712 can include the first control interface 722. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system, optical circuitry, waveguides, wireless circuitry, wireline circuitry, or a combination thereof.

The first storage unit 714 can store the first software 726. The first storage unit 714 can also store the relevant information, such as advertisements, points of interest, navigation routing entries, or any combination thereof.

The first storage unit 714 can be a volatile memory, a nonvolatile memory, an internal memory, an external memory, or a combination thereof. For example, the first storage unit 714 can be a nonvolatile storage such as nonvolatile random access memory, Flash memory, disk storage, or a volatile storage such as static random access memory.

The first storage unit 714 can include the first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. Examples of the output device of the first user interface 718 can include the first display interface 730. The first display interface 730 can include a display, a projector, a video screen, a speaker, or any combination thereof.

The location unit 720 can generate location information, current heading, current acceleration, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof. Also, for example, the location unit 720 can utilize components such as an accelerometer or GPS receiver.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations external to the first device 102.

The location interface 732 can include different implementations depending on which functional units or external units are being interfaced with the location unit 720. The location interface 732 can be implemented with technologies and techniques similar to the implementation of the first control unit 712.

For illustrative purposes, the first device 102 is shown with the partition having the first control unit 712, the first storage unit 714, the first user interface 718, the first communication unit 716, and the location unit 720 although it is understood that the navigation system 100 can have a different partition. For example, the first software 726 can be partitioned differently such that some or all of its function can be in the first control unit 712, the location unit 720, and the first communication unit 716. Also, the first device 102 can include other functional units not shown in FIG. 7 for clarity.

The functional units in the first device 102 can work individually and independently of the other functional units. The first device 102 can work individually and independently from the second device 106 and the communication path 104.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine, a digital signal processor, or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a micro electromechanical system, optical circuitry, waveguides, wireless circuitry, wireline circuitry, or a combination thereof.

A second storage unit 746 can store the second software 742. The second storage unit 746 can also store the relevant information, such as advertisements, points of interest, navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory, Flash memory, disk storage, or a volatile storage such as static random access memory.

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

A first detecting sensor 752 is defined as a device to capture the acceleration 210 of FIG. 2A for contacting the road object 226 of FIG. 2B. For example, the first detecting sensor 752 can include an accelerometer, a speedometer, a profiling device, or a combination thereof.

A second detecting sensor 754 is defined as a device to capture the acceleration 210 for contacting the road object 226. For example, the second detecting sensor 754 can include an accelerometer, a speedometer, a profiling device, or a combination thereof.

Figure 8B:
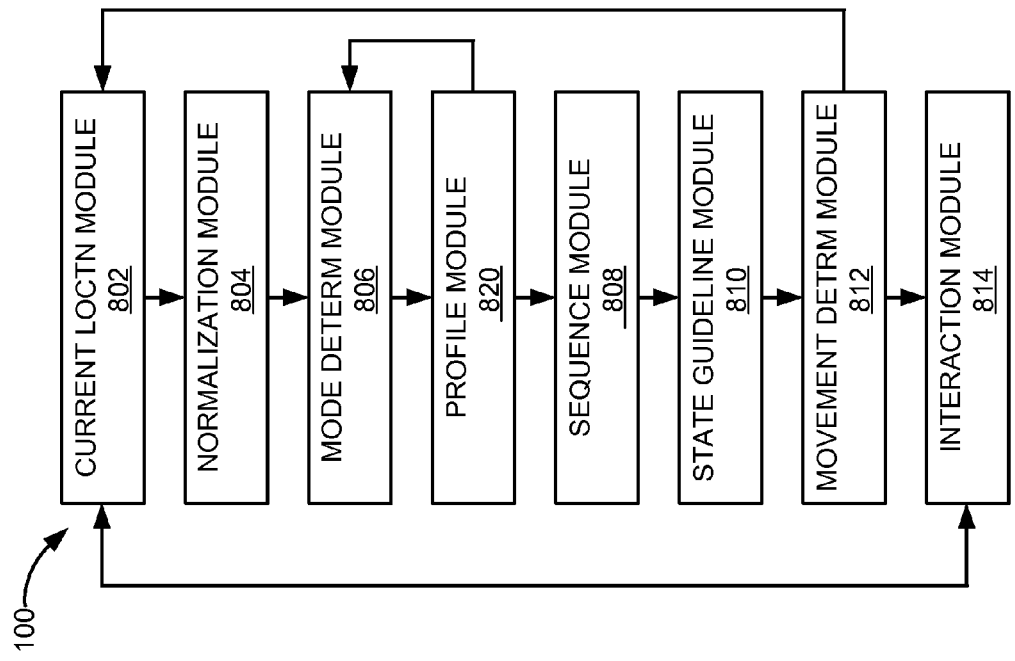
FIG. 8B is a second control flow of the navigation system.
Figure 8A:
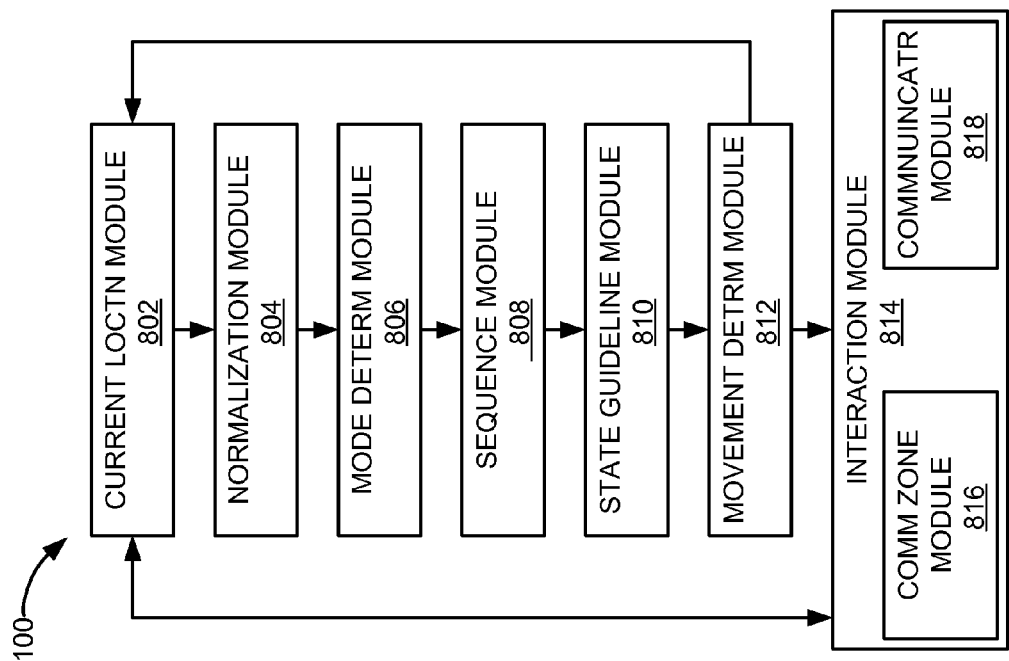
FIG. 8A is a first control flow of the navigation system.

Referring now to FIG. 8A, therein is shown a first control flow of the navigation system 100. The navigation system 100 can include a current location module 802, a normalization module 804, a mode determination module 806, a sequence module 808, a state guideline module 810, a movement determination module 812, and an interaction module 814.

The current location module 802 can be coupled to the normalization module 804, the movement determination module 812, and the interaction module 814. The normalization module 804 can be coupled to the mode determination module 806. The mode determination module 806 can be coupled to the sequence module 808, which can be coupled to the state guideline module 810. The state guideline module 810 can be coupled to the movement determination module 812, which can be coupled to the current location module 802 and the interaction module 814.

The purpose of the current location module 802 is to locate the user of the navigation system 100 or more specifically for this example, the first device 102, and identify the surrounding environment of the user. The current location module 802 can identify the device-location 208 of FIG. 2A and display the device-location 208 on the map 204 of FIG. 2A. The current location module 802 can identify the lane 206 of FIG. 2A, the first vehicle 216 of FIG. 2A, the second vehicle 220 of FIG. 2A, or a combination thereof and overlay the corresponding location or locations on the map 204.

The current location module 802 can use the feedback from the movement determination module 812 to determine the travel path 212 of FIG. 2A, the second-vehicle movement 224 of FIG. 2A, the various warnings, or a combination thereof. The current location module 802 can also determine the lane 206 based on the feedback from the movement determination module 812.

The current location module 802 can also utilize the location unit 720 of FIG. 7 to detect the acceleration 210 of FIG. 2A of the first device 102. The details of the operation of the current location module 802 will be discussed below.

The purpose of the normalization module 804 is to condition the information from the location unit 720 of FIG. 7 for other modules to process and translate the orientation of the first device 102 to match the axes of travel. The normalization module 804 can filter out the glitches in the acceleration 210. For example, the normalization module 804 can mask the acceleration 210 that is close to white noise, a random fluctuation in the signal characterizing the information, or that is less than 0.001 g for less than 0.01 seconds. The normalization module 804 can filter out the small movements associated with the mode of travel, such as road vibration or the vertical undulation that occurs during walking.

The normalization module 804 can also normalize the axes of the acceleration 210. The first device 102 can be oriented in different ways during travel. For example, while an in-dash navigation unit would have fixed axes of travel relative to its orientation, a hand-held unit or a smart phone can be oriented differently relative to the direction of travel.

The normalization module 804 can translate the orientation of the first device 102 to match the axes of travel. The normalization module 804 can detect the axes of travel in many ways.

For example, the normalization module 804 can detect the axes of travel by using the direction most often travelled and the gravitational pull of the earth. The normalization module 804 can set the direction most often travelled as forward or equivalent axis and polarity. The normalization module 804 can set the direction of the gravitational pull as down or other equivalent axis and polarity.

Also, for example, the normalization module 804 can detect the axes of travel by using visual cues. The normalization module 804 can view the surroundings of the first device 102 for visual cues, such as the human body or the shape of various vehicles. The normalization module 804 can derive from the visual cues the type of travel and the orientation of the first device 102 relative to the axes of travel.

The normalization module 804 can use the first control unit 712, the second control unit 734, the location unit 720, or a combination thereof to translate the orientation of the first device 102 to the axes of travel. The normalization module 804 can use the first storage unit 714, the second storage unit 746, or a combination thereof to store the re-oriented axes of the first device 102.

The purpose of the mode determination module 806 is to determine the user's current state of travel. The mode determination module 806 determines the travel state 402 of FIG. 4 based on the acceleration 210. The mode determination module 806 can determine the travel state 402 by comparing the acceleration 210, the previous state 514 of FIG. 5, the various counts, such as the left count 502 of FIG. 5 or the constant count 510 of FIG. 5, or a combination thereof to the state change condition 404 of FIG. 4.

Table 1 depicts an example state transition table as shown in FIG. 4. Table 1 depicts the state-path name 406 of FIG. 4 and the state change condition 404 associated with the state-path name 406.

TABLE 1

State transition table

| State Path Name | State Change Condition |
|---|---|
| X1 | accel_z > 0.05 g AND prev_state = ST |
| X2 | \|accel_z\| < 0.05 g AND prev_state = AC AND \|diff_z\| < 0.005 g |
| X3 | accel_x > 0.1 g OR (accel_x > 0.05 g AND left_count >= 10 (2 sec)) |
| X4 | accel_z < −0.1 g OR (accel_z < −0.05 g AND decel_count >= 10 (2 sec)) |
| X5 | \|accel_z\| < 0.05 g AND prev_state = ST AND const_count >= 15 (3 sec) |
| X6 | accel_z > 0.05 g AND prev_state = CV AND accel_count >= 10 (2 sec) |
| X7 | accel_z < −0.1 g OR (accel_z < −0.05 g AND decel_count >= 10 (2 sec)) |
| X8 | accel_x > 0.1 g OR (accel_x > 0.05 g AND left_count >= 10 (2 sec)) |
| X9 | accel_z > 0.1 g OR (accel_z > 0.05 g AND accel_count >= 10 (2 sec)) |
| X10 | accel_x < −0.1 g OR (accel_x < −0.05 g AND right_count >= 10 (2 sec)) |
| X11 | \|accel_z\| < 0.05 g AND prev_state = AC AND \|diff_z\| < 0.005 g |
| X12 | prev_state = CV |
| X13 | accel_z < −0.1 g OR (accel_z < −0.05 g AND decel_count >= 10 (2 sec)) |
| X14 | accel_x < −0.1 g OR (accel_x < −0.05 g AND right_count >= 10 (2 sec)) |
| X15 | accel_x < −0.1 g OR (accel_x < −0.05 g AND right_count >= 10 (2 sec)) |
| X16 | accel_z > 0.1 g OR (accel_z > 0.05 g AND accel_count >= 10 (2 sec)) |
| X17 | prev_state = AC |
| X18 | accel_x > 0.1 g OR (accel_x > 0.05 g AND left_count >= 10 (2 sec)) |
| X19 | accel_x > 0.1 g OR (accel_x > 0.05 g AND left_count >= 10 (2 sec)) |
| X20 | \|accel_z\| < 0.05 g AND prev_state = AC AND \|diff_z\| < 0.005 g |
| X21 | accel_x < −0.1 g OR (accel_x < −0.05 g AND right_count >= 10 (2 sec)) |
| X22 | accel_x > 0.1 g |
| X23 | accel_x < −0.1 g |
| X24 | accel_z < −0.1 g OR (accel_z < −0.05 g AND decel_count >= 10 (2 sec)) |
| X25 | accel_z < −0.1 g OR (accel_z < −0.05 g AND decel_count >= 10 (2 sec)) |
| X26 | \|diff_z\| < 0.005 g AND const_count >= 10 (2 sec) AND prev_state = DC |
| X27 | \|diff_z\| < 0.005 g AND prev_state = ST |
| X28 | accel_z < −0.1 g OR (accel_z < −0.05 g AND decel_count >= 10 (2 sec)) |
| X29 | accel_z > 0.1 g |
| X30 | \|diff_z\| < 0.005 g AND static_count >= 10 (2 sec) |
| X31 | accel_x < −0.1 g OR (accel_x < −0.05 g AND right_count >= 10 (2 sec)) |
| X32 | \|diff_z\| < 0.005 g AND static_count >= 10 (2 sec) |
| X33 | accel_x > 0.1 g OR (accel_x > 0.05 g AND left_count >= 10 (2 sec)) |
| X34 | \|diff_z\| < 0.005 g AND static_count >= 10 (2 sec) |

When the first device 102 is initialized or at rest with zero velocity, the mode determination module 806 can determine the travel state 402 to be the static state 408 of FIG. 4. The mode determination module 806 can determine the travel state 402 as a different state when the state change condition 404 is met. The state change condition 404 can be predefined by the user, the navigation system 100, or the software manufacturer.

The transition between states can be labeled with the state-path name 406. The state-path name 406 can be predefined by the user, the navigation system 100, or the software manufacturer for various transitions.

The state change condition 404 for going from the static state 408 to the acceleration state 410 of FIG. 4 can be the acceleration 210 being greater than 0.05 g forward, or in the +z direction. The transition from the static state 408 to the acceleration state 410 can have the state-path name 406 of X1.

When the travel state 402 of the first device 102 is the static state 408 and the acceleration 210 is greater than 0.05 g in the +z direction, the mode determination module 806 can determine the travel state 402 as the acceleration state 410. The mode determination module 806 can shift the static state 408 value from the travel state 402 to the previous state 514 when the state change condition 404 is met.

The state change condition 404 for going from the acceleration state 410 to the constant velocity state 414 of FIG. 4 can be the magnitude of the acceleration 210 being less than 0.05 g along the z-axis, and while the difference of one sample of the acceleration 210 to the next being less than 0.005 g in magnitude or while the constant count 510 being greater than or equal to 3 seconds. The transition from the acceleration state 410 to the constant velocity state 414 can have X2 as the state-path name 406.

For example, if the first device 102 that is initially in the acceleration state 410 does not accelerate or decelerate more than 0.05 g and steady within 0.005 g, the mode determination module 806 can determine the travel state 402 as the constant velocity state 414. The previous state 514 would then be assigned the acceleration state 410.

The state change condition 404 for going from the constant velocity state 414 to the left turn state 418 of FIG. 4 can be the acceleration 210 being greater than 0.1 g in the left, or +x direction, or the acceleration 210 in the +x direction is greater than 0.05 g and the left count 502 is greater than or equal to 2 seconds. The transition from the acceleration state 410 to the constant velocity state 414 can have X3 as the state-path name 406.

For example, if the first device 102 that is initially in the constant velocity state 414 accelerates to the left more than 0.1 g or less than 0.05 g for 2 seconds or more, the mode determination module 806 can determine the travel state 402 as the left turn state 418. The previous state 514 would then be assigned the constant velocity state 414.

The state change condition 404 for going from the left turn state 418 to the deceleration state 412 of FIG. 4 can be the acceleration 210 being less than −0.1 g along the z-axis or the acceleration 210 being less than −0.05 g along the z-axis and the deceleration count 508 of FIG. 5 being greater than or equal to 2 seconds. The transition from the left turn state 418 to the deceleration state 412 can have X4 as the state-path name 406.

For example, if the first device 102 that is initially in the left turn state 418 decelerates more than 0.05 g for 2 seconds or more, the mode determination module 806 can determine the travel state 402 as the deceleration state 412. The previous state 514 would then be assigned the left turn state 418.

The state change condition 404 for going from the deceleration state 412 to the constant velocity state 414 can be the magnitude of the acceleration 210 being less than 0.05 g along the z-axis and the constant count 510 being greater than or equal to 3 seconds. The transition from the deceleration state 412 to the constant velocity state 414 can have X5 as the state-path name 406.

For example, if the first device 102 that is initially in the deceleration state 412 does not accelerate or decelerate more than 0.05 g for 3 seconds or more, the mode determination module 806 can determine the travel state 402 as the constant velocity state 414. The previous state 514 would then be assigned the deceleration state 412.

The state change condition 404 for going from the constant velocity state 414 to the acceleration state 410 can be the acceleration 210 being greater than 0.05 g forward, or in the +z direction, and the acceleration count 506 of FIG. 5 being greater than or equal to 2 seconds. The transition from the constant velocity state 414 to the acceleration state 410 can have X6 as the state-path name 406.

For example, if the first device 102 that is initially in the constant velocity state 414 accelerates forward more than 0.05 g for 2 seconds or more, the mode determination module 806 can determine the travel state 402 as the acceleration state 410. The previous state 514 would then be assigned the constant velocity state 414.

The state change condition 404 for going from the acceleration state 410 to the deceleration state 412 can be the acceleration 210 being less than −0.1 g along the z-axis, or the acceleration 210 being less than −0.05 g along the z-axis and the deceleration count 508 being greater than or equal to 2 seconds. The transition from the acceleration state 410 to the deceleration state 412 can have X7 as the state-path name 406.

For example, if the first device 102 that is initially in the acceleration state 410 decelerates more than 0.1 g or more than 0.05 g for 2 seconds or more, the mode determination module 806 can determine the travel state 402 as the deceleration state 412. The previous state 514 would then be assigned the acceleration state 410.

The state change condition 404 for going from the deceleration state 412 to the left turn state 418 can be the acceleration 210 being greater than 0.1 g in the +x direction, or the acceleration 210 being greater than 0.05 g in the +x direction and the left count 502 being greater than or equal to 2 seconds. The transition from the deceleration state 412 to the left turn state 418 can have X8 as the state-path name 406.

For example, if the first device 102 that is initially in the deceleration state 412 accelerates left more than 0.1 g or more than 0.05 g for at least 2 seconds, the mode determination module 806 can determine the travel state 402 as the left turn state 418. The previous state 514 would then be assigned the deceleration state 412.

The state change condition 404 for going from the left turn state 418 to the acceleration state 410 can be the acceleration 210 being greater than 0.1 g in the +z direction, or the acceleration 210 being greater than 0.05 g in the +x direction and the left count 502 being greater than or equal to 2 seconds. The transition from the left turn state 418 to the acceleration state 410 can have X9 as the state-path name 406.

For example, if the first device 102 that is initially in the left turn state 418 accelerates forward more than 0.1 g or more than 0.05 g for at least 2 seconds, the mode determination module 806 can determine the travel state 402 as the acceleration state 410. The previous state 514 would then be assigned the left turn state 418.

The state change condition 404 for going from the acceleration state 410 to the right turn state 416 of FIG. 4 can be the acceleration 210 being less than −0.1 g along the x-axis or the acceleration 210 being less than −0.05 g along the x-axis and the right count 504 being greater than or equal to 2 seconds.

The transition from the acceleration state 410 to the right turn state 416 can have X10 as the state-path name 406.

For example, if the first device 102 that is initially in the acceleration state 410 accelerates to the right more than 0.1 g, the mode determination module 806 can determine the travel state 402 as the right turn state 416. The previous state 514 would then be assigned the acceleration state 410.

The state change condition 404 for going from the right turn state 416 to the constant velocity state 414 can be the magnitude of the acceleration 210 being less than 0.05 g along the z-axis, and maintaining the magnitude of the difference between one sample of the acceleration 210 to the next to be less than 0.005 g. The transition from the right turn state 416 to the constant velocity state 414 can have X11 as the state-path name 406.

For example, if the first device 102 that is initially in the right turn state 416 accelerates forward or decelerates less than 0.05 g and within 0.005 g, the mode determination module 806 can determine the travel state 402 as the constant velocity state 414. The previous state 514 would then be assigned the right turn state 416.

The state-path name 406 of X12 can show the case where the travel state 402 remains as the constant velocity state 414. The travel state 402 can remain as the constant velocity state 414 until there is a change in the acceleration 210.

The state change condition 404 for going from the constant velocity state 414 to the deceleration state 412 can be the acceleration 210 being less than –0.1 g along the z-axis, or the acceleration 210 being less than –0.05 g along the z-axis and the deceleration count 508 is greater than 2 seconds. The transition from the constant velocity state 414 to the deceleration state 412 can have X13 as the state-path name 406.

For example, if the first device 102 that is initially in the constant velocity state 414 decelerates more than 0.1 g or more than 0.05 g for 2 seconds, the mode determination module 806 can determine the travel state 402 as the deceleration state 412. The previous state 514 would then be assigned the constant velocity state 414.

The state change condition 404 for going from the deceleration state 412 to the right turn state 416 can be the acceleration 210 being less than –0.1 g along the x-axis, or the acceleration 210 being less than –0.05 g along the x-axis and the right count 504 is greater than 2 seconds. The transition from the deceleration state 412 to the right turn state 416 can have X14 as the state-path name 406.

For example, if the first device 102 that is initially in the deceleration state 412 accelerates right more than 0.1 g or more than 0.05 g for at least 2 seconds, the mode determination module 806 can determine the travel state 402 as the right turn state 416. The previous state 514 would then be assigned the deceleration state 412.

The state-path name 406 of X15 can show the case where the travel state 402 remains as the right turn state 416. The travel state 402 can continue to stay as the right turn state 416 if the acceleration 210 remains less than –0.1 g along the x-axis, or if the acceleration 210 remains less than –0.05 g along the x-axis after the initial 2 seconds necessary to have entered the right turn state 416.

The state change condition 404 for going from the right turn state 416 to the acceleration state 410 can be the acceleration 210 being greater than 0.1 g along the z-axis, or the acceleration 210 being greater than 0.05 g along the z-axis and the acceleration count 506 being greater than or equal to 2 seconds. The transition from the right turn state 416 to the acceleration state 410 can have X16 as the state-path name 406.

For example, if the first device 102 that is initially in the right turn state 416 accelerates forward more than 0.1 g or more than 0.05 g for at least 2 seconds, the mode determination module 806 can determine the travel state 402 as the acceleration state 410. The previous state 514 would then be assigned the right turn state 416.

The state-path name 406 of X17 can show the case where the travel state 402 remains as the acceleration state 410. The travel state 402 can continue to stay as the acceleration state 410 if the acceleration 210 remains less than 0.1 g along the z-axis, or if the acceleration 210 remains greater than 0.05 g along the z-axis after the initial 2 seconds necessary to have entered the acceleration state 410.

The state change condition 404 for going from the acceleration state 410 to the left turn state 418 can be the acceleration 210 being greater than 0.1 g along the x-axis or the acceleration 210 being greater than 0.05 g along the x-axis and the left count being greater than or equal to 2 seconds. The transition from the acceleration state 410 to the left turn state 418 can have X18 as the state-path name 406.

For example, if the first device 102 that is initially in the acceleration state 410 accelerates left more than 0.1 g, the mode determination module 806 can determine the travel state 402 as the left turn state 418. The previous state 514 would then be assigned the acceleration state 410.

The state-path name 406 of X19 can show the case where the travel state 402 remains as the left turn state 418. The travel state 402 can continue to stay as the left turn state 418 if the acceleration 210 remains greater than 0.1 g along the x-axis, or if the acceleration 210 remains greater than 0.05 g along the x-axis after the initial 2 seconds necessary to have entered the left turn state 418.

The state change condition 404 for going from the left turn state 418 to the constant velocity state 414 can be the magnitude of the acceleration 210 being less than 0.05 g along the z-axis and the magnitude of the difference between one sample of the acceleration 210 and the next is less than 0.005 g. The transition from the left turn state 418 to the constant velocity state 414 can have X20 as the state-path name 406.

For example, if the first device 102 that is initially in the left turn state 418 maintains the acceleration 210 magnitude less than 0.05 g along the z-axis for at least 3 seconds, the mode determination module 806 can determine the travel state 402 as the constant velocity state 414. The previous state 514 would then be assigned the left turn state 418.

The state change condition 404 for going from the constant velocity state 414 to the right turn state 416 can be the acceleration 210 being less than –0.1 g along the x-axis or the acceleration 210 being less than –0.05 g along the x-axis with the right count 504 being greater than or equal to 2 seconds. The transition from the constant velocity state 414 to the right turn state 416 can have X21 as the state-path name 406.

For example, if the first device 102 that is initially in the constant velocity state 414 accelerates right more than 0.1 g or more than 0.05 g for 2 seconds or more, the mode determination module 806 can determine the travel state 402 as the right turn state 416. The previous state 514 would then be assigned the constant velocity state 414.

The state change condition 404 for going from the right turn state 416 to the left turn state 418 can be the acceleration 210 being greater than 0.1 g along the x-axis. The transition from the right turn state 416 to the left turn state 418 can have X22 as the state-path name 406.

For example, if the first device 102 that is initially in the right turn state 416 accelerates left more than 0.1 g, the mode determination module 806 can determine the travel state 402 as the left turn state 418. The previous state 514 would then be assigned the right turn state 416.

The state change condition 404 for going from the left turn state 418 to the right turn state 416 can be the acceleration 210 being less than −0.1 g along the x-axis. The transition from the left turn state 418 to the right turn state 416 can have X23 as the state-path name 406.

For example, if the first device 102 that is initially in the left turn state 418 accelerates right more than 0.1 g, the mode determination module 806 can determine the travel state 402 as the right turn state 416. The previous state 514 would then be assigned the left turn state 418.

The state change condition 404 for going from the right turn state 416 to the deceleration state 412 can be the acceleration 210 being less than −0.1 g along the z-axis or the acceleration 210 being less than −0.05 g along the z-axis and the deceleration count 508 being 2 seconds or more. The transition from the right turn state 416 to the deceleration state 412 can have X24 as the state-path name 406.

For example, if the first device 102 that is initially in the right turn state 416 decelerates more than 0.1 g or more than 0.05 g for 2 seconds or more, the mode determination module 806 can determine the travel state 402 as the deceleration state 412. The previous state 514 would then be assigned the right turn state 416.

The state-path name 406 of X25 can show the case where the travel state 402 remains as the deceleration state 412. The travel state 402 can continue to stay as the deceleration state 412 if the acceleration 210 remains less than −0.1 g along the z-axis or the acceleration 210 remains less than −0.05 g along the z-axis past the 2 seconds necessary to have entered the deceleration state 412.

The state change condition 404 for going from the deceleration state 412 to the static state 408 can be the magnitude of the acceleration 210 being less than 0.005 g along the z-axis and the constant count 510 being 2 seconds or more, and the previous state 514 being the deceleration state 412. The transition from the deceleration state 412 to the static state 408 can have X26 as the state-path name 406.

For example, if the first device 102 that is initially in the deceleration state 412 does not accelerate forward or backward more than 0.005 g for 2 seconds or more, the mode determination module 806 can determine the travel state 402 as the static state 408. The previous state 514 would then be assigned the deceleration state 412.

It has been discovered that the present invention provided the navigation system 100 that provide easier usability for the user. The determination of the static state 408 using solely the previous state 514 and the acceleration 210 allows the navigation system 100 to detect the first device 102 coming to a stop independent of accessing the velocity information of the first device 102. This independence reduces computation while provide accurate position even if other positional system are not available thereby allowing the navigation system 100 as a positional system user for the user to use and to rely upon.

The navigation system 100 does not have to access the components sensing the speed of the individual vehicles. The navigation system 100 can be used without altering or adapting to the vehicle used for travelling. For example, a handheld device can determine the vehicle coming to a stop as is, without requiring the user to install any components or connect to any vehicles.

It has yet further been discovered that the present invention provided the navigation system 100 that provide improved safety in avoiding collisions. The determination of the static state 408 using the previous state 514 and the acceleration 210 allows the navigation system 100 to detect the first device 102 coming to a stop independent of accessing the velocity information of the first device 102. The reduction of computation and independence of other positional system information allows faster processing and faster notification to avoid collisions and provide safe driving.

The navigation system 100 can save execution time by eliminating the need to calculate the velocity or access GPS information to determine that the user has come to a stop. By improving the time necessary to determine the vehicle coming to a stop, the navigation system 100 can warn vehicles near the user quicker. The faster warning can allow other vehicles to avoid colliding with the user.

The state-path name 406 of X27 can show the case where the travel state 402 remains as the static state 408. The travel state 402 can continue to stay as the static state 408 if the magnitude of the acceleration 210 remains less than 0.005 g along the z-axis.

The state change condition 404 for going from the static state 408 to the deceleration state 412 can be the acceleration 210 being less than −0.1 g along the z-axis or the acceleration 210 being less than −0.05 and the deceleration count 508 is greater than or equal to 2 seconds. The transition from the static state 408 to the deceleration state 412 can have X28 as the state-path name 406.

For example, if the first device 102 that is initially in the static state 408 moves backwards by accelerating backwards more than 0.1 g, the mode determination module 806 can determine the travel state 402 as the deceleration state 412. The previous state 514 would then be assigned the static state 408.

The state change condition 404 for going from the deceleration state 412 to the acceleration state 410 can be the acceleration 210 being less than 0.1 g along the z-axis. The transition from the deceleration state 412 to the acceleration state 410 can have X29 as the state-path name 406.

For example, if the first device 102 that is initially in the deceleration state 412 moving backwards slows down by accelerating forward more than 0.1 g, the mode determination module 806 can determine the travel state 402 as the acceleration state 410. The previous state 514 would then be assigned the deceleration state 412.

The state change condition 404 for going from the acceleration state 410 to the static state 408 can be the magnitude of the acceleration 210 being less than 0.005 g along the z-axis and the constant count 510 being 2 seconds or more. The transition from the acceleration state 410 to the static state 408 can have X30 as the state-path name 406.

For example, if the first device 102, which is initially in the acceleration state 410 by having slowed down the backwards movement, does not accelerate forward or backward more than 0.005 g for 2 seconds or more, the mode determination module 806 can determine the travel state 402 as the static state 408. The previous state 514 would then be assigned the acceleration state 410.

The state change condition 404 for going from the static state 408 to the right turn state 416 can be the acceleration 210 being less than −0.1 g along the x-axis, or the acceleration 210 being less than −0.05 g along the x-axis and the right count 504 being greater than or equal to 2 seconds. The transition from the static state 408 to the right turn state 416 can have X31 as the state-path name 406.

For example, if the first device 102, which is initially in the static state 408 accelerates right more than 0.1 g or more than 0.05 for 2 seconds or more, the mode determination module 806 can determine the travel state 402 as the right turn state 416. The previous state 514 would then be assigned the static state 408.

The state change condition 404 for going from the right turn state 416 to the static state 408 can be the magnitude of the acceleration 210 being less than 0.005 g along the z-axis and the constant count 510 being 2 seconds or more. The transition from the right turn state 416 to the static state 408 can have X32 as the state-path name 406.

For example, if the first device 102 that is initially in the right turn state 416 does not accelerate forward or backward more than 0.005 g for 2 seconds or more, the mode determination module 806 can determine the travel state 402 as the static state 408. The previous state 514 would then be assigned the right turn state 416.

The state change condition 404 for going from the static state 408 to the left turn state 418 can be the acceleration 210 being greater than 0.1 g along the x-axis, or the acceleration 210 being greater than 0.05 g along the x-axis and the left count 502 being greater than or equal to 2 seconds. The transition from the static state 408 to the left turn state 418 can have X33 as the state-path name 406.

For example, if the first device 102, which is initially in the static state 408 accelerates left more than 0.1 g or more than 0.05 for 2 seconds or more, the mode determination module 806 can determine the travel state 402 as the left turn state 418. The previous state 514 would then be assigned the static state 408.

The state change condition 404 for going from the left turn state 418 to the static state 408 can be the magnitude of the acceleration 210 being less than 0.005 g along the z-axis and the constant count 510 being 2 seconds or more. The transition from the left turn state 418 to the static state 408 can have X34 as the state-path name 406.

For example, if the first device 102 that is initially in the left turn state 418 does not accelerate forward or backward more than 0.005 g for 2 seconds or more, the mode determination module 806 can determine the travel state 402 as the static state 408. The previous state 514 would then be assigned the left turn state 418.

The state change condition 404 for going from the constant velocity state 414 to the steady right state 420 of FIG. 4 can be the magnitude of the acceleration 210 being less than 0.005 g along the z-axis and either the acceleration 210 along the x-axis being less than 0.1 g or the acceleration 210 along the x-axis being less than 0.05 g and the right count 504 being greater than or equal to 2 seconds. The state change condition 404 for entering the steady right state 420 can be the combination of the state change condition 404 for entering the constant velocity state 414 and the right turn state 416.

For example, if the first device that is initially in the constant velocity state 414 doesn't accelerate forward or backward more than 0.005 g and either accelerates to the right more than 0.1 g, or maintains acceleration to the right more than 0.05 g for 2 seconds or more, the mode determination module 806 can determine the travel state 402 as the steady right state 420. The previous state 514 would then be assigned the constant velocity state 414.

The state change condition 404 for going from the constant velocity state 414 to the steady left state 422 of FIG. 4 can be the magnitude of the acceleration 210 being less than 0.005 g along the z-axis and either the acceleration 210 along the x-axis being greater than 0.1 g or the acceleration 210 along the x-axis being greater than 0.05 g and the right count 504 being greater than or equal to 2 seconds. The state change condition 404 for entering the steady left state 422 can be the combination of the state change condition 404 for entering the constant velocity state 414 and the left turn state 418.

For example, if the first device that is initially in the constant velocity state 414 doesn't accelerate forward or backward more than 0.005 g and either accelerates to the left more than 0.1 g, or maintains acceleration to the left more than 0.05 g for 2 seconds or more, the mode determination module 806 can determine the travel state 402 as the steady left state 422. The previous state 514 would then be assigned the constant velocity state 414.

The steady right state 420 and the steady left state 422 can be defined as a subset of the constant velocity state 414. The transition from the steady right state 420 or the steady left state 422 to other states can be the same as that for the constant velocity state 414. The state-path name 406 for the transition from the constant velocity state 414 to another state would be the same for the transition from the steady right state 420 to the same state.

In determining the right turn state 416, the left turn state 418, the steady right state 420, and the steady left state 422, the mode determination module 806 can compare the direction of the acceleration 210 to the direction of the road on the map 204 of FIG. 2A. The mode determination module 806 can compare the acceleration 210 to the road to distinguish between following a curvy road and making a turn or the lane-change 214.

The mode determination module 806 can calculate the magnitude in the change of direction on a road by comparing the direction of travel before and after the bend. The mode determination module 806 can determine the magnitude of the acceleration 210 that will result from following the road at different speeds.

The mode determination module 806 can determine the acceleration 210 to follow a bend in the road on the map 204. The mode determination module 806 can use a predetermined formula or a look-up table that associates the acceleration 210 to the amount of change in direction and the speed to determine the acceleration 210 needed to follow a bend in the road. The method, such as a formula or a look-up table, for determining the acceleration 210 necessary to follow the road can be predetermined by the navigation system 100, the software manufacturer, or both.

The mode determination module 806 can use the velocity of the first device 102 to compute the necessary acceleration for following the bend or turn in the road using the predetermined method. The mode determination module 806 can subtract the calculated acceleration necessary for following road from the acceleration 210. The mode determination module 806 can use the resulting value for determining the travel state 402.

For example, if a road on a mountain bends to the left, which the mode determination module 806 determines as requiring 0.1 g acceleration to the left when the device is traveling at 30 miles/hour, the mode determination module can subtract 0.1 g from the acceleration 210 before determining the travel state 402. If the acceleration 210 is 0.1002 g while maintaining 30 miles/hour, the mode determination module 806 can determine that the first device 102 is following the road by using 0.0002 g for determining the travel state 402.

Continuing with the example, if the acceleration 210 is 0 g while maintaining 30 miles/hour, the mode determination module 806 can subtract 0.1 g from 0 g. The mode determination module 806 can use −0.1 g acceleration along the x-axis to find the right turn state 416 or the steady right state 420.

The mode determination module 806 can also use the details of the lane 206 instead of the road to calculate the magnitude in the change of direction. The calculation of the necessary acceleration for following the lane can be the same as that of the road.

The mode determination module 806 can associate the device-location 208 to the travel state 402 using the KML format. The mode determination module 806 can associate the travel state 402 to the geographical location where the travel state 402 occurred. The KML format is a way to express geographic annotation and visualization on the internet, developed for use with Google Earth™. The KML format requires the location information to have the longitude and the latitude. The KML format has the altitude as optional information.

The mode determination module 806 can associate the longitude and latitude of the location where the travel state 402 changed to the travel state 402 using the KML format. The mode determination module 806 can replace the optional altitude information with a Boolean value indicating whether the travel state 402 changed at the corresponding longitude and latitude. The mode determination module 806 can also replace the altitude information with the travel state 402 instead of a Boolean value.

The peak depicted in FIG. 6 is a graphical representation of the travel state 402 and the location of the travel state 402 using the KML format. The location of the flat line on the map 204 indicates the longitude and latitude components kept in the KML format where the travel state 402 is the constant velocity state 414.

The peak rising above the float line depicts a change in the altitude according to the KML format. Since the mode determination module 806 can replace the altitude information in the KML format with the travel state 402 or changes in the travel state 402, the bottom edge where the peak starts to rise indicates the longitude and latitude of where the travel state 402 changes from the constant velocity state 414 to the steady right state 420. The bottom edge where the peak falls back to the same level indicates the longitude and latitude of where the travel state changes from the steady right state 420 to the constant velocity state 414.

The physical transformation of the travel state 402, such as when the first devices 102 goes from the acceleration state 410 to the static state 408 or when the first device 102 goes into the right turn state 416, results in movement in the physical world, such as the user coming to a stop at a red light or turning the vehicle to the right, based on the operation of the navigation system 100. The movement of people and vehicles in the real world can be fed back to the navigation system 100 to further operate the navigation system 100 to locate and guide the user.

The mode determination module 806 can use the first control unit 712, the second control unit 734, the location unit 720, or a combination thereof to determine the travel state 402. The mode determination module 806 can store the travel state 402 and the previous state 514 in the first storage unit 714, the second storage unit 746, or a combination thereof.

The purpose of the sequence module 808 is to track the user's movements at a lane-level granularity during the user's travel. The sequence module 808 identifies the travel sequence 516 of FIG. 5 involving the travel state 402. The sequence module 808 can identify the travel sequence 516 by retaining a predetermined number of states leading up to the travel state 402 and the previous state 514.

The sequence module 808 can define and use the sliding window 512 of FIG. 5 to identify the travel sequence 516. The sequence module 808 can input the travel state 402 into the sliding window 512 using a first-in-first-out (FIFO) method. The sequence module 808 can identify the sequence involving the travel state 402 in the sliding window 512 as the travel sequence 516.

The sequence module 808 can use the FIFO method initially by inputting the static state 408 in the first slot of the sliding window 512 when the first device 102 is initialized. When there is movement, the sequence module 808 can move the static state 408 to the next slot in the sliding window 512 and the newly determined state into the slot for the travel state 402.

For example, if the first device 102 goes from the static state 408 to the acceleration state 410, the static state 408 can first be NULL-NULL-the static state 408. The NULL designation represents that the slot does not have a value at the current moment. After the acceleration state 410 is determined, the sequence module 808 can then shift the values and identify the travel sequence as NULL-the static state 408-the acceleration state 410.

The sequence module 808 can discard the value of the state that is shifted out of the last slot in the travel sequence 516. Continuing with the above example, when the travel sequence 516 is predetermined to be 3 states, the NULL value will be discarded when a new state is determined. When the travel state 402 is determined to be the constant velocity state 414, the sequence module 808 can shift the values and discard the last NULL to identify the travel sequence 516 as the static state 408-the acceleration state 410-the constant velocity state 414.

The sequence module 808 can use the first control unit 712, the second control unit 734, or a combination thereof to shift and discard the states for identifying the travel sequence 516. The sequence module 808 can store the travel sequence 516 in the first storage unit 714, the second storage unit 746, or a combination thereof.

The purpose of the state guideline module 810 is to set the patterns of movements that signify different actions of the user. The state guideline module 810 sets the lane-level granularity movement 213 as the predetermined sequence 517 of FIG. 5 of the travel state 402.

For illustrative purposes, the operation involving the lane-change 214 will be described as an example. The state guideline module 810 can set the lane-change 214 as the predetermined sequence 517 of the travel state 402.

The state guideline module 810 can predetermine the sequences for setting the lane-change 214 through various ways. For example, the state guideline module 810 can record the state sequences of known behavior to predetermine the sequences for setting the various actions or use logical progression to define the state sequence.

The state guideline module 810 can record the states of vehicles travelling on roads where the location of the lane 206 has been identified. When the GPS coordinates of a vehicle goes from one lane to another, thereby executing the lane-change 214, the state guideline module 810 can record the states before, during, and after the lane-change 214. The recorded sequence can be the predetermined sequence 517 of the travel state 402 for determining the lane-change 214.

The state guideline module 810 can also predetermine the sequences for setting the various actions based on the progressions of events. For example, the state guideline module 810 can utilize the progression of events of the lane-change 214.

The lane-change 214 requires the first device 102 to accelerate in a direction incongruent to the direction of the road. The acceleration 210 is incongruent to the direction of the road when the direction of the acceleration 210 is not in the same direction as the direction of the road.

Continuing with the example, the state guideline module 810 can match each event of the progression to the state change conditions 404. The result of the lane-change 214 can be the constant velocity state 414-the steady right state 420 or the steady left state 422-the constant velocity state 414.

The state guideline module 810 can also predetermine the sequences for setting the various actions by querying the user. Also, the software manufacturer or the hardware manufacturer can store the sequences into the state guideline module 810.

The state guideline module 810 sets the lane-change 214 as the predetermined sequence 517 of the travel state 402. The state guideline module 810 can set the lane-change 214 to the left as the constant velocity state 414-the steady left state 422-the constant velocity state 414. The state guideline module 810 can set the lane-change 214 to the right as the constant velocity state 414-the steady right state 420-the constant velocity state 414.

The state guideline module 810 also sets the hazardous deceleration 526 as the predetermined sequence 517 of the travel state 402 for notifying the first vehicle 216 that is traveling behind the user. The state guideline module 810 can set the hazardous deceleration 526 as the acceleration 210 less than −0.2 g along the x-axis. For example, the state guideline module 810 can set the hazardous deceleration 526 as when the device slows down more than 0.2 g.

The state guideline module 810 also sets the accident-sequence 522 as the predetermined sequence 517 of the travel state 402. The state guideline module 810 can set the accident-sequence 522 as the acceleration 210 in any direction with magnitude greater than 0.5 g for 0.5 seconds or less. For example, the state guideline module 810 can define the accident-sequence 522 as an impact, defined by large magnitude of the acceleration 210 lasting for a short period of time.

The state guideline module 810 also sets the swerving pattern 524 as the predetermined sequence 517 of the acceleration 210 in comparison to the lane. The state guideline module 810 can set the swerving pattern 524 as a set of accelerations over a period of time that does not execute the lane-change 214. For example, the state guideline module 810 can set the swerving pattern 524 as 5 or more accelerations along the x-axis, each with magnitude less than 0.5 g and lasting for 0.5 seconds or less, over a 5-minute period without the lane-change 214.

The state guideline module 810 also sets the swerving pattern 524 as the predetermined sequence 517 of positions within the lane 206. The state guideline module 810 can use the positions within the lane 206 to set the swerving pattern 524. For example, the state guideline module 810 can set the swerving pattern 524 as 5 or more direction changes that are incongruent to the direction of the lane 206, occurring within a segment of 1 mile or 1 block.

The state guideline module 810 can also set the sequences defining the simultaneous merge 306. The state guideline module 810 can define the simultaneous merge 306 as when the first device 102 and the second vehicle 220 move toward each other or the same lane.

For example, the simultaneous merge 306 can be defined as when the first device 102 is in the steady right state 420 and the second vehicle 220 to the right of the first device 102 is in the steady left state 422. Also, for example, the simultaneous merge 306 can be defined as when the travel state 402 of the first device 102 is the steady left state 422 and the second-vehicle movement 224 of the second vehicle 220 to the left of the first device 102 is the steady right state 420.

The state guideline module 810 can use the first control unit 712, the second control unit 734, the first user interface 718, the second user interface 738, or a combination thereof to set the various patterns. The state guideline module 810 can store the various patterns in the first storage unit 714, the second storage unit 746, or a combination thereof.

The purpose of the movement determination module 812 is to determine the status of the user based on the user's movements. The movement determination module 812 determines the lane-level granularity movement 213 with the travel sequence 516 matching the predetermined sequence 517 for displaying on the first device 102. The movement determination module 812 can determine status such as the lane-change 214, the hazardous deceleration 526, the simultaneous merge 306, the traffic accident 302, the unstable-driving status 308, or a combination thereof.

The movement determination module 812 can determine the status when the acceleration 210 and/or the travel sequence 516 matches the sequence predefined for the status. The sequences for each status can be predefined by the state guideline module 810.

For the purposes of illustration, the lane-change 214 will be used as an example of the lane-level granularity movement 213. The movement determination module 812 determines the lane-change 214 with the travel sequence 516 matching the predetermined sequence 517 for displaying on the first device 102. The movement determination module 812 can determine the lane-change 214 when the travel sequence 516 matches the left shift sequence 518 or the right shift sequence 520.

The movement determination module 812 can also compare the movement displacement 304 to the map 204 for determining the lane-change 214. The movement determination module 812 can compare the movement displacement 304, the direction of the acceleration 210, and the road on the map 204 to determine the lane-change 214.

The movement determination module 812 can compare the combination of the movement displacement 304 and the direction of the acceleration 210 to the direction of the road from the map 204. The movement determination module 812 can calculate the lateral and forward-backward displacements making up the movement displacement 304 using methods such as extrapolating the movement displacement 304 by integrating the acceleration 210, trigonometry, or a combination thereof. The movement determination module 812 can calculate the lateral and forward-backward displacements of the road being travelled using the same method.

The movement determination module 812 can calculate the components making up the movement displacement 304 by integrating the acceleration 210 along the movement axis. For example, if the acceleration 210 was both 3 feet/minute/minute to the left and 4 feet per/minute/minute for 3 minutes forward, the movement displacement 304 would be a combination of 13.5 feet displacement to the left and 18 feet displacement forward.

The movement determination module 812 can also calculate the components making up the movement displacement 304 using trigonometry. For example, if the user travels 5 feet in the direction 36.9 degrees to the left from the direction of the road, the movement displacement 304 would be 5 feet. The movement determination module 812 can calculate the x-axis component of the movement displacement 304 by multiplying the magnitude of the movement displacement 304 by the sine of 36.86 degrees. The movement determination module 812 can calculate the x-axis component of the movement displacement 304 to be 3 feet to the left.

Continuing with the example, the movement determination module 812 can calculate the z-axis component of the movement displacement 304 by multiplying the magnitude of the movement displacement 304 by the cosine of 36.86 degrees. The movement determination module 812 can calculate the z-axis component of the movement displacement 304 to be 4 feet forward.

The movement determination module 812 can determine the occurrence of the lane-change 214 when the difference between the displacements of the first device 102 and the road meets or exceeds a threshold amount of distance. The threshold amount of distance can be the average width of the lane 206 or the known width of the lane 206 at the device-location 208.

For example, the map 204 can indicate that the lane 206 is straight. The acceleration 210 can be 0.1 g for 1 second to the left, with the movement displacement 304 of 20 feet. The movement determination module 812 can calculate that the first device 102 travelled 16 feet forward and 12 feet laterally.

Continuing with the example, the difference between the displacement of the first device 102 and the road would show 12 feet of displacement orthogonal to the direction of the road. The movement determination module 812 can compare the displacement of the first device 102 and determine the occurrence of the lane-change 214 if the displacement is greater than or equal to the average width of the lane 206 or the known width of the lane 206 at the device-location 208.

The movement determination module 812 determines the hazardous deceleration 526 with the travel sequence 516 matching the predetermined sequence 517. The movement determination module 812 can determine the hazardous deceleration 526 when the acceleration 210 meets or exceeds the threshold amount defined by the state guideline module 810.

The movement determination module 812 determines the simultaneous merge 306 with the travel sequence 516 and the second-vehicle movement 224 matching the predetermined sequence 517 of the travel state 402 and the second-vehicle movement 224. The movement determination module 812 can determine the simultaneous merge 306 when the travel sequence 516 of the user and the second-vehicle movement 224 matches the conditions defined by the state guideline module 810.

The movement determination module 812 determines the traffic accident 302 with the travel sequence 516 matching the accident-sequence 522. The movement determination module 812 can determine the traffic accident 302 when the acceleration 210 meets or exceeds the threshold amount defined by the state guideline module 810.

The movement determination module 812 determines the unstable-driving status 308 with the swerving pattern 524 matching a consecutive sequence of the acceleration 210. The movement determination module 812 can determine the unstable-driving status 308 when the travel sequence 516 or a consecutive sequence of the acceleration 210 matches the swerving pattern 524 defined by the state guideline module 810.

The movement determination module 812 determines the unstable-driving status 308 with the swerving pattern 524 matching the travel path 212. The movement determination module 812 can also determine the unstable-driving status 308 when the travel path 212 matches the swerving pattern 524 defined by the state guideline module 810.

The physical transformation of the lane-level granularity movement 213, such as the lane-change 214, results in movement in the physical world, such as getting in the correct lane for taking a desired exit or junction on a highway, based on the operation of the navigation system 100. The movement of people and vehicles in the real world can be fed back to the navigation system 100 to further operate the navigation system 100 to locate and guide the user.

The movement determination module 812 can use the first control unit 712, the second control unit 734, the location unit 720, or a combination thereof to determine the lane-level granularity movement 213. The movement determination module 812 can compare the sequences of travel and the predetermined states stored in the first storage unit 714, the second storage unit 746, or a combination thereof to determine the status or event.

The purpose of the interaction module 814 is to send and receive messages between devices through peer-to-peer communication. The interaction module 814 can include a communication zone module 816 and a communicator module 818.

The purpose of the communication zone module 816 is to determine the area in which the peer-to-peer communication will be enabled. The communication zone module 816 sets the peer-to-peer communication zone 310 of FIG. 3 for broadcasting status of the first device 102.

The communication zone module 816 can set the peer-to-peer communication zone 310 by detecting the capabilities of the transmitting means, such as the first communication unit 716 or the communication path 104. The capabilities of the transmitting means can be designated by the device manufacturer, the navigation system 100, the software manufacturer, or a combination thereof.

The signal-traffic volume of the communication path 104 can be predetermined by the user, the navigation system 100, the software manufacturer, or a combination thereof based on the location and the time of day. The volume can also be determined by counting the number of messages the interaction module 814 can receive over a period of time. The communication zone module 816 can compare the number of messages to a predetermined threshold to detect the capabilities of the transmitting means.

For example, the communication zone module 816 can detect that the transmitter for sending the message can transmit 20 feet in average signal-traffic environment and 15 feet in busy signal-traffic environment. The communication zone module 816 can detect the signal activity of the surrounding area to be busy signal-traffic environment and set the peer-to-peer communication zone 310 to a circular area with 15 feet radius around the first device 102.

The communication zone module 816 can also set the peer-to-peer communication zone 310 by varying the signal strength of the transmitting device. The user, the navigation system 100, software manufacturer, or a combination thereof can vary the strength of the signal being sent from the transmitting device based on the signal traffic surrounding the first device 102.

For example, if the navigation system 100 selects 15 feet as appropriate distance for warning other vehicles, the communication zone module 816 can adjust the signal strength of the first communication unit 716 to send the signals at least 15 feet. The communication zone module 816 can have a predetermined table correlating different levels of signal strengths to distances in various signal traffic situations. The predetermined table can be specified by the user, the navigation system 100, the software manufacturer, the hardware manufacturer, or a combination thereof.

The communication zone module 816 can use the first control unit 712, the second control unit 734, the first communication unit 716, the second communication unit 736, the location unit 720, or a combination thereof to set the peer-topeer communication zone 310. The communication zone module 816 can store the peer-to-peer communication zone 310 in the first storage unit 714, the second storage unit 746, or a combination thereof.

The purpose of the communicator module 818 is to communicate with other vehicles or devices in the peer-to-peer communication zone 310. The purpose of the communicator module 818 is also to send the device-location 208 of FIG. 2A at the time of the traffic accident 302 to emergency services. The purpose of the communicator module 818 is also to receive a message regarding the traffic accident 302 and the lane 206 of the traffic accident 302 from other devices or vehicles.

The communicator module 818 broadcasts the traffic accident 302 of FIG. 3 and the lane 206 of the traffic accident 302 directly within the peer-to-peer communication zone 310. The communicator module 818 can broadcast within the peer-to-peer communication zone 310 by sending a message by transmitting the signal at a level or method as determined by the peer-to-peer communication zone 310.

The communicator module 818 can send a message that notifies the devices or vehicles within the peer-to-peer communication zone 310 of the traffic accident 302 and the lane 206 in which the traffic accident 302 occurred. The communicator module 818 can send the device-location 208 through all possible protocols available in the first device 102, such as a 911 phone call or text message, to emergency services, such as the police or the park ranger.

The communicator module 818 can receive the peer-to-peer communication from other cars within the peer-to-peer communication zone 310. The communicator module 818 can receive messages, such as the traffic accident 302 and the lane 206 of the traffic accident 302 from other devices or vehicles.

The communicator module 818 can use the first control unit 712, the second control unit 734, the first communication unit 716, the second communication unit 736, the location unit 720, or a combination thereof to send messages within the peer-to-peer communication zone 310. The communicator module 818 can use the first storage unit 714, the second storage unit 746, or a combination thereof to identify the emergency services and the communication protocol and the first control unit 712, the second control unit 734, the first communication unit 716, the second communication unit 736, the location unit 720, or a combination thereof to communicate with emergency services.

Referring now to FIG. 8B, therein is shown a second control flow of the navigation system 100. The navigation system 100 can include the current location module 802, the normalization module 804, the mode determination module 806, a profile module 820, the sequence module 808, the state guideline module 810, the movement determination module 812, and the interaction module 814. The interaction module 814 includes the communication zone module 816 of FIG. 8A and the communicator module 818 of FIG. 8A. The profile module 820 can couple to the mode determination module 806.

Continuing from the details regarding the mode determination module 806 in FIG. 8A, the mode determination module 806 can determine the travel state 402. More specifically, the mode determination module 806 can determine the object detection state 424 by comparing the acceleration 210 of FIG. 2A, the previous state 514 of FIG. 5, various counts, such as the rise count 528 of FIG. 5 and the drop count 530 of FIG. 5, or a combination thereof to the state change condition 404 of FIG. 4.

Table 2 depicts an example state transition table as shown in FIG. 4. Table 2 depicts the state-path name 406 of FIG. 4 and the state change condition 404 associated with the state-path name 406.

TABLE 2

State transition table

| State Path Name | State Change Conditions |
|---|---|
| X35 | prev_state = AC AND norm_highpass > 0.003 g |
| X36 | norm_highpass < 0.003 g |
| X37 | prev_state = CV AND norm_highpass > 0.003 g |
| X38 | norm_highpass < 0.003 g |
| X39 | prev_state = DC AND norm_highpass > 0.003 g |
| X40 | norm_highpass < 0.003 g |

For example, the road object 226 can be a pothole. The object detection state 424 can involve the detection of the pothole while traveling along the travel path 212 of FIG. 2A. Continuing from FIG. 8A, the state change condition 404 for going from the acceleration state 410 of FIG. 4 to the speedup vertical state 426 of FIG. 4 for contacting with a pothole can be the magnitude of the acceleration 210 being greater than 0.003 g along the y-axis. The transition from the acceleration state 410 to the speedup vertical state 426 can have X35 as the state-path name 406.

The state change condition 404 for going from the object detection state 424 to the constant velocity state 414 of FIG. 4 after contacting with a pothole can be the magnitude of the acceleration 210 being less than, for example and written for illustrative purposes, 0.003 g along the y-axis. The transition from the object detection state 424 to the constant velocity state 414 can have X36 as the state-path name 406.

The state change condition 404 for going from the constant velocity state 414 to the constant velocity vertical state 430 of FIG. 4 for contacting with a pothole can be the magnitude of the acceleration 210 being greater than 0.003 g along the y-axis. The transition from the constant velocity state 414 to the constant velocity vertical state 430 can have X37 as the state-path name 406.

The state change condition 404 for going from the object detection state 424 to the acceleration state 410 after contacting with a pothole can be the magnitude of the acceleration 210 being less than 0.003 g along the y-axis. The transition from the object detection state 424 to the acceleration state 410 can have X38 as the state-path name 406.

The state change condition 404 for going from the object detection state 424 to the deceleration state 412 of FIG. 4 after contacting with a pothole can be the magnitude of the acceleration 210 being less than 0.003 g along the y-axis. The transition from the object detection state 424 to the deceleration state 412 can have X39 as the state-path name 406.

The state change condition 404 for going from the deceleration state 412 to the slowdown vertical state 428 of FIG. 4 for contacting with a pothole can be the magnitude of the acceleration 210 being greater than 0.003 g along the y-axis. The transition from the deceleration state 412 to the slowdown vertical state 428 can have X40 as the state-path name 406.

The mode determination module 806 can determine the object detection state 424 with the first detecting sensor 752 of FIG. 7 or the second detecting sensor 754 of FIG. 7 representing an accelerometer by determining the road object detection 230 for identifying the type of the road object 226. For example, the road object 226 can be a pothole. If the road object 226 is a pothole, the first detecting sensor 752 can detect the drop count 530 followed by the rise count 528. Furthermore, the first detecting sensor 752 can detect the acceleration 210 greater than 0.003 g of negative y direction followed by the acceleration 210 greater than 0.003 g of positive y direction. As a result, the mode determination module 806 can detect the road object 226 to be a pothole. Subsequently, the mode determination module 806 can determine the object detection state 424 to be contacting with the road object 226 representing a pothole.

In contrast, if the road object 226 is a speed bump, the first detecting sensor 752 can detect the rise count 528 followed by the drop count 530. Furthermore, the first detecting sensor 752 can detect the acceleration 210 greater than 0.003 g of positive y direction followed by the acceleration 210 greater than 0.003 g of negative y direction. As a result, the mode determination module 806 can detect the road object 226 to be a speed bump. Subsequently, the mode determination module 806 can determine the object detection state 424 to be contacting with the road object 226 representing a speed bump.

For a different example, the mode determination module 806 can determine the object detection state 424 with the first detecting sensor 752 or the second detecting sensor 754 representing a profiling device. The profiling device can measure the contour of the road object 226 by measuring the acoustic, light, ultrasound, or a combination thereof captured upon scanning the road object 226.

The profiling device can determine that a pothole having a peak representing the rim or edge of the pothole and a bottom based on the differences of acoustic, light, ultrasound, or a combination thereof captured from the peak or the bottom. More specifically, the mode determination module 806 can compare the contour detected to the International Roughness Index (IRI) to determine that the contour matches the profile of a pothole. As a result, the mode determination module 806 can determine the object detection state 424 to be contacting with a pothole.

The purpose of the profile module 820 is to generate the object profile 232 of FIG. 2B based on the type of the road object 226 contacted by the navigation system 100. As a specific example, the mode determination module 806 can determine the geographic location of a pothole to be Pike Street between Second Avenue and Third Avenue in Seattle, Wash. via the location unit 720 of FIG. 7.

More specifically, the mode determination module 806 can detect that the acceleration 210 induced by the pothole to be −0.0035 g along the y-axis followed by +0.003 g along the y-axis. Additionally, the mode determination module 806 can detect, for example, the drop count 530 to be 0.4 second followed by the rise count 528 of 0.5 second. The profile module 820 can generate the object profile 232 of the road object 226 to be −0.0035 g y-axis, +0.003 g y-axis, 0.4 second for the drop count 530, 0.5 second for the rise count 528, and Pike Street.

The profile module 820 can generate the object profile 232 for the road object 226 collected by the mode determination module 806 in various geographic locations to profile each of the road object 226. More specifically, the profile module 820 can generate the acceleration 210, the drop count 530 and the rise count 528, the contour data collected by the profiling machine, and the geographic location of the road object 226.

For illustrative purposes, the profile module 820 can generate the object profile 232 based on the acceleration 210, the drop count 530 and the rise count 528, the contour data collected by the profiling machine, and the geographic location of the road object 226, although it is understood the navigation system 100 can operate the profile module 820 differently. For example, the profile module 820 can update the object profile 232.

Continuing from the previous example, the object profile 232 for the pothole on Pike Street can change over time. More specifically, the mode determination module 806 can detect the object profile 232 to be −0.004 g y-axis, +0.003 g y-axis, 0.6 second for the drop count 530, 0.4 second for the rise count 528. The profile module 820 can update the object profile 232 of the road object 226 based on the acceleration 210, the drop count 530 and the rise count 528, the contour data collected by the profiling machine, and the geographic location of the road object 226.

For illustrative purposes, the mode determination module 806 can determine the object detection state 424 by the first detecting sensor 752 or the second detecting sensor 754 detecting the acceleration 210, the rise count 528, the drop count 530, or a combination thereof, although it is understood that the navigation system 100 can operate the mode determination module 806 differently. For example, the mode determination module 806 can determine the object detection state 424 based on the object profile 232.

Continuing with the previous example, the first detecting sensor 752 can detect the acceleration 210 to be −0.003 g along the y-axis followed by +0.003 g y-axis for contacting the road object 226 on Pike Street, Washington. The profile module 820 can include the object profile 232 for the acceleration 210 with −0.003 g along the y-axis followed by +0.003 g y-axis for contacting a pothole on Pike Street, Washington. As a result, the mode determination module 806 can identify the road object 226 to be a pothole on Pike Street by comparing the acceleration 210 detected to the acceleration 210 in the object profile 232. Subsequently, the mode determination module 806 can determine the object detection state 424 to be contacting with the road object 226 representing a pothole on Pike Street.

It has been discovered that the generation of the object profile 232 can improve the efficiency for identifying the road object 226. By comparing the object profile 232 to the detected information of the acceleration 210, the rise count 528, and the drop count 530 for contacting the road object 226, the navigation system 100 can quickly determine the type of the road object 226. As a result, the navigation system 100 can reduce the computation burden for identifying the road object 226, thus, improving the usability and safety of operating the navigations system 100.

It has been further discovered that the generation of the object profile 232 can improve a navigation guidance for the user of the first device 102 to avoid traveling along the route with the road object 226. By having an up-to-date geographic location of the road object 226 in the object profile 232, the navigation system 100 can generate the navigation guidance based on the object profile 232 to aid the user of the first device 102 to avoid encountering the road object 226 for traveling along the route, thus, improving the safety of the user. Further, the improved navigation guidance can enhance the enjoyment of operating and decrease the wear and tear of the vehicle by guiding the user away from the route with the road object 226. As a result, the navigation system 100 can improve the usability and safety of operating the navigation system 100 for generating the navigation guidance.

The state guideline module 810 sets the condition inducing movement 228 of FIG. 2B as the predetermined sequence 517 of FIG. 5 of the travel state 402. The state guideline module 810 sets the object identification sequence 532 as the predetermined sequence 517 of the travel state 402. For example, the state guideline module 810 can set the object identification sequence 532 based on the object detection state 424.

More specifically, the state guideline module 810 can match each event of the progression to the state change condition 404. For example, the object identification sequence 532 for the object detection state 424 for identifying the road object 226 representing a pothole can be the constant velocity state 414-the constant velocity vertical state 430 of FIG. 4. For further example, the constant velocity vertical state 430 for pothole can include the acceleration 210 greater than 0.003 g of positive y direction followed by the acceleration 210 greater than 0.003 g of negative y direction. For different example, the constant velocity vertical state 430 for pothole can include the drop count 530 of 0.5 second followed by the rise count 528 of 0.5 second.

The movement determination module 812 determines the condition inducing movement 228 with the travel sequence 516 matching the predetermined sequence 517 for displaying on the first device 102. The movement determination module 812 can determine status such as the road object detection 230. For example, the movement determination module 812 can determine the road object detection 230 when the travel sequence 516 matches the object identification sequence 532. The movement determination module 812 can determine the condition inducing movement 228 based on the object detection state 424 for detecting the acceleration 210, the rise count 528, the drop count 530, or a combination thereof. Additionally, the movement determination module 812 can determine the condition inducing movement 228 based on matching the road object detection 230 to the object profile 232.

It has been discovered that the determination of the object detection state 424 improves the efficiency of the navigation system 100 determining the travel state 402 in relation to detecting the road object 226. By setting the object detection state 424 as the predetermined sequence 517, the navigation system 100 can determine the road object detection 230 independent of accessing the velocity information of the first device 102. This independence reduces computation while provide accurate identification of the road object 226 even if the first detecting sensor 752 or the second detecting sensor 754 are unavailable.

Figure 9:
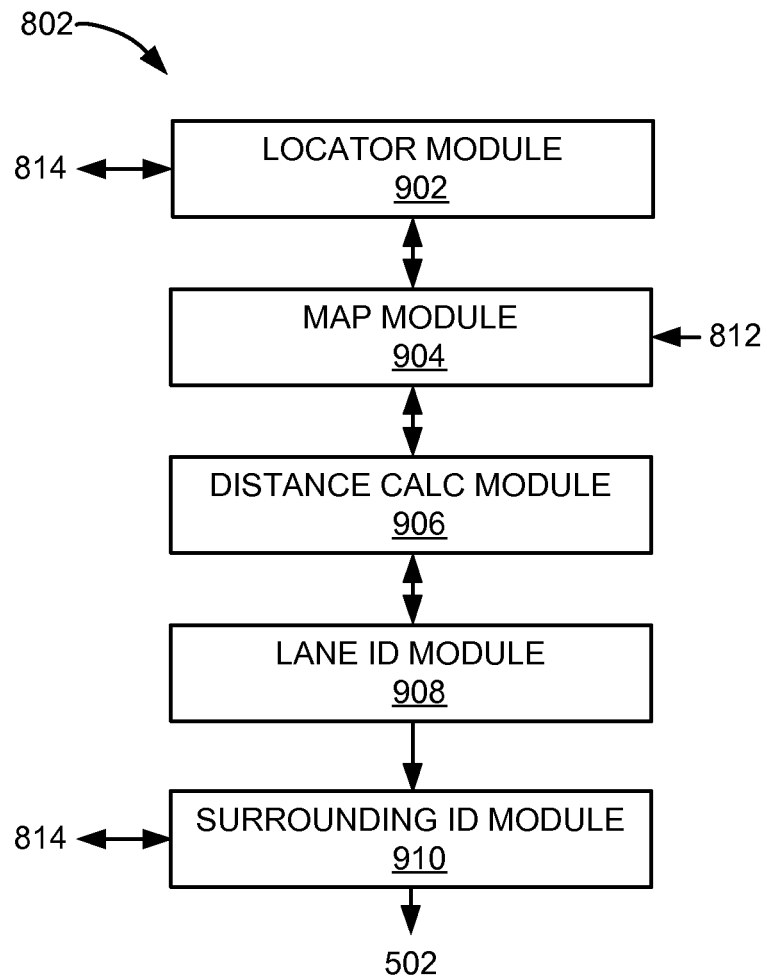
FIG. 9 is a detailed view of the current location module of FIG. 8A and FIG. B.

Referring now to FIG. 9, therein is shown a detailed view of the current location module 802 of FIG. 8A and FIG. 8B. The current location module 802 can include a locator module 902, a map module 904, a distance calculation module 906, a lane identification module 908, and a surrounding identification module 910. The locator module 902 and the surrounding identification module 910 can be coupled to the interaction module 814.

The locator module 902 can be coupled to the map module 904 and the communicator module 818 of FIG. 8A and FIG. 8B. The map module 904 can be coupled to the distance calculation module 906 and the movement determination module 812 of FIG. 8A and FIG. 8B. The distance calculation module 906 can be coupled to the lane identification module 908. The lane identification module 908 can be coupled to the surrounding identification module 910, which can be coupled to the mode determination module 806 of FIG. 8A and FIG. 8B and the communicator module 818.

The purpose of the locator module 902 is to locate and monitor the movement of the first device 102 of FIG. 7. The locator module 902 identifies a device-location for locating the first device 102. The locator module 902 can locate the movement of the first device 102 by verifying a starting location and tracking the movements.

The locator module 902 can check the location of the first device 102 upon initialization of the first device 102. The locator module 902 can check the location using GPS coordinates, cellular tower triangulation, user input, or a combination thereof. The locator module 902 can locate the first device 102 at initialization by setting the location information as the device-location 208 of FIG. 2A at the time of initialization.

The locator module 902 can also identify the device-location 208 after initialization. The locator module 902 can acquire the coordinates, such as cellular tower triangulation coordinates or GPS coordinates, or the calculated result of the device-location 208, such as the results of the distance calculation module 906.

The locator module 902 can also identify the device-location 208 at regular intervals. The locator module 902 can identify the device-location 208 at a predetermined interval, such as twice a second and/or when the first device 102 accelerates. The interval for identifying the device-location 208 can be predetermined by the navigation system 100, the user, the software manufacturer, the hardware manufacturer, or a combination thereof.

The locator module 902 can use the first control unit 712 of FIG. 7, the second control unit 734 of FIG. 7, the first communication unit 716 of FIG. 7, the second communication unit 736 of FIG. 7, the location unit 720, or a combination thereof to locate and track the movements of the first device 102. The locator module 902 can use the first storage unit 714 of FIG. 7, the second storage unit 746 of FIG. 7, or a combination thereof to store the device-location 208 and the travel path 212.

The purpose of the map module 904 is to display the map 204 and the user's location on the map 204. The map module 904 selects the map 204 having the device-location 208 therein. The map module 904 can selects the map 204 by locating an area map that has the device-location 208. The navigation system 100 can store different area maps, which the map module 904 can access to locate an area map that has the device-location 208 therein. The map module 904 can also overlay the device-location 208 and other location related entities, such as the lane 206 or the first vehicle 216 of FIG. 2A, on the map 204.

The map module 904 can use the first control unit 712, the second control unit 734, or a combination thereof to select the map 204 from area maps stored in the first storage unit 714, the second storage unit 746, or a combination thereof. The map module 904 can use the first display interface 730 of FIG. 7, the second display interface 740 of FIG. 7, or a combination thereof to display the map 204 and other location related entities.

The purpose of the distance calculation module 906 is to keep track of the movement of the first device 102. The distance calculation module 906 can keep track of the movement of the first device 102 by calculating the movement displacement 304 of FIG. 3 based on the acceleration 210 of FIG. 2A.

The distance calculation module 906 can count the duration of the acceleration 210 using various counters corresponding to the direction of the acceleration 210. When the location unit 720 of FIG. 7 detects the acceleration 210 of the first device 102, the distance calculation module 906 can increment the corresponding counters.

For example, when the location unit 720 detects the acceleration 210 forward, or in the +z direction, the distance calculation module 906 can increment the acceleration count 506 of FIG. 5. The distance calculation module 906 can reset the acceleration count 506 to zero when the acceleration 210 in the forward direction goes back to zero.

Also, for example, when the location unit 720 detects the first device 102 slowing down, or accelerating in the −z direction, the distance calculation module 906 can increment the deceleration count 508 of FIG. 5. The distance calculation module 906 can reset the deceleration count 508 to zero when the acceleration 210 along the z-axis reaches zero.

In the same way, the distance calculation module 906 can increment the left count 502 of FIG. 5 when the acceleration 210 is in the +x direction and increment the right count 504 of FIG. 5 when the acceleration 210 is in the −x direction. The distance calculation module 906 can reset all counts when the acceleration 210 in the corresponding direction is zero or when the velocity of the first device 102 is zero.

The distance calculation module 906 can increment the constant count 510 of FIG. 5 when the acceleration is zero. The constant count 510 can indicate the duration of time at which the travel state 402 has remained the same. For example, the constant count 510 can indicate how long the user has been at rest or moving at a constant velocity.

The distance calculation module 906 can track the movement of the first device 102 by using the acceleration 210, the velocity, and the various counts to calculate the displacement of the first device 102. The distance calculation module 906 can calculate the travel path 212 of FIG. 2A as the amount and direction of the displacement.

The distance calculation module 906 can calculate the travel path 212 by calculating the movement displacement 304. The distance calculation module 906 can calculate the movement displacement 304 in many ways. For example, the distance calculation module 906 can use integrals, functions of time, look up tables, or a combination thereof to calculate the displacement.

The distance calculation module 906 can calculate the movement displacement 304 by integrating the acceleration 210 of the first device 102 over time. For example, the distance calculation module 906 can use a hardware or software integrator to translate the acceleration 210 into the travel path 212.

The distance calculation module 906 can also use functions of time to calculate the travel path 212. The distance calculation module 906 can calculate the average of the acceleration 210 over a time period. The distance calculation module 906 can calculate the average of the acceleration 210 by using the values of the acceleration 210 over regular sampling intervals, adding the values, and then dividing by the number of values.

For example, if the first device 102 goes from being at rest to accelerating at 1 g over 10 seconds, the distance calculation module 906 can sample the acceleration each second. If the first device 102 increased the acceleration in a linear fashion, where the rate of increase is constant, each sample would increase by 0.1 g. There would be 11 samples including the sample at time zero, and the total sum of the samples would be 5.5 g. Dividing the sum of the samples by the number of samples, the distance calculation module 906 can calculate the average acceleration over the 10 seconds as 0.5 g.

The distance calculation module 906 can use the average of the acceleration 210 and the acceleration count 506 to calculate the travel path 212. The distance calculation module 906 can divide the average of the acceleration 210 in 2, and then multiply the result by the squared value of the acceleration count 506 to calculate the travel path 212.

Continuing with the previous example, the distance calculation module 906 can calculate the distance traveled by the first device 102 with the acceleration 210 of 0.5 g, or 16.1 feet/s/s with the acceleration count 506 of 10 seconds. The distance calculation module 906 can divide the acceleration 210 by two to find 8.05. The distance calculation module 906 can multiply the result by the square of the acceleration count 506, or 100, to find 805 feet. The distance calculation module 906 can calculate the travel path 212 as 805 feet in the direction of the acceleration 210.

The distance calculation module 906 can also have a look-up table predetermined by the user, the navigation system 100, the software manufacturer, the hardware manufacturer, or a combination thereof. The distance calculation module 906 can find the distance tied to the value of the acceleration 210 and the duration of the acceleration 210. For example, the distance calculation module 906 can find on the look-up table that the distance tied to the acceleration 210 of 0.5 g for 10 seconds is 805 feet.

The distance calculation module 906 can add the calculated displacement, or the travel path 212, to the initial position to find the device-location 208. Continuing with the previous example, the device-location 208 would be 805 feet away from where the first device 102 was initialized, in the direction of the acceleration 210.

The distance calculation module 906 can also calculate the displacement during the constant velocity state 414 to find the travel path 212. The distance calculation module 906 can multiply the velocity of the first device 102 and the constant count 510 to find the displacement of the first device 102. For example, if the user's vehicle traveled 10 miles/hour for 2 hours, the distance calculation module 906 can multiply 10 and 2 to find that the vehicle traveled 20 miles.

The distance calculation module 906 can calculate the travel path 212 periodically and/or when there is a change in the state. For example, the distance calculation module 906 can calculate the travel path 212 every second or when the acceleration 210 is not zero, whichever occurs first. The interval for calculating the travel path 212 can be predetermined by the navigation system 100, the user, the software manufacturer, the hardware manufacturer, or a combination thereof.

The distance calculation module 906 can add the travel path 212 to the device-location 208 that was last identified to find the device-location 208 at the current time. The distance calculation module 906 can locate and track the location of the first device 102 by calculating the device-location 208 and the travel path 212.

The locator module 902 can also identify the device-location 208 using the GPS for monitoring the movement of the first device 102. The locator module 902 can calculate the movement displacement 304 using the global positioning system.

The locator module 902 can calculate the movement displacement 304 by querying and receiving the GPS coordinates of the first device 102 at regular intervals. The locator module 902 can identify the device-location 208 by assigning the GPS coordinates of the first device 102 as the device-location 208. The querying interval can be predetermined by the user, the navigation system 100, the software manufacturer, the hardware manufacturer, or a combination thereof.

The locator module 902 can calculate the travel path 212 using the GPS for locating the first device 102. The locator module 902 can sequentially link the device-location 208 found at each query interval to calculate the travel path 212.

The locator module 902 can monitor the movement of the first device 102 when GPS coordinates become unavailable. When the locator module 902 does not receive the GPS coordinates, the locator module 902 can use the last known GPS coordinate and calculate the travel path 212 using the integration, time function, look-up table, or a combined method described above. The locator module 902 can continue querying for the GPS coordinates and switch back to monitoring the movements using the GPS coordinates when they become available.

The purpose of the lane identification module 908 is to identify the lane 206 based on the map 204. The lane identification module 908 can identify the lane 206 by dividing the width of the road on the map 204 by an average width of the lane 206 and noting the location between the average widths.

The lane identification module 908 can also identify the lane 206 by tracking the locations where the lane-change 214 occurs. Since the lane-change 214 can be determined using a comparison of states, the lane-change 214 can be determined before the lane 206 is identified. The lane identification module 908 can mark the middle of the movement displacement 304 as the division marking the lane 206.

The lane identification module 908 can also identify the lane 206 by recognizing the boundaries of the lane 206 marked on the map 204. The map 204 can contain the location of the lane 206 on the road. The lane identification module 908 can identify the lane 206 as the space of road between the boundaries marking the ends of the lane 206.

The lane identification module 908 can use the first control unit 712, the second control unit 734, the location unit 720, or a combination thereof to identify the lane 206 based on the map 204 stored in the first storage unit 714 of FIG. 7, the second storage unit 746 of FIG. 7, or a combination thereof. The lane identification module 908 can store the position of the lane 206 along with the map 204 in the first storage unit 714 of FIG. 7, the second storage unit 746 of FIG. 7, or a combination thereof.

The purpose of the surrounding identification module 910 is to identify, locate, and track the movements of the devices, vehicles, or entities within a threshold distance of the first device 102. The surrounding identification module 910 can identify, locate, and monitor the devices or vehicles near the first device 102 in many ways. For example, the surrounding identification module 910 can identify the location of all users of the navigation system 100 and identify the ones near the device, or directly communicate with devices, vehicles, or entities within a threshold distance.

The surrounding identification module 910 can keep track of the location of all users that are using the navigation system 100, and identify the users within a threshold distance from the first device 102. The threshold distance for identifying the surrounding vehicles or devices can be predetermined by the user, the navigation system 100, the software manufacturer, or a combination thereof. The surrounding identification module 910 can identify the name, number, or other identification information of the surrounding device or vehicle if the location of the device or vehicle is within the threshold distance from the first device 102.

The surrounding identification module 910 can monitor the location and movement of the device or vehicle by querying the GPS coordinates of the device or vehicle that is a part of the navigation system 100. When the GPS coordinates of the device or vehicle is not available, the surrounding identification module 910 can track the movement using the last known GPS coordinate and calculating the travel path 212 using the integration, time function, look-up table, or a combined method described above.

The surrounding identification module 910 can also identify, locate, and monitor the devices or vehicles near the first device 102 using peer-to-peer communication. The surrounding identification module 910 can query the identification and the location of all devices or vehicles within the peer-to-peer communication zone 310 of FIG. 3.

The surrounding identification module 910 can monitor the movement of the devices or vehicles by regularly querying the identification, location, and the acceleration 210 of all devices or vehicles within the peer-to-peer communication zone 310. For example, the surrounding identification module 910 can query for and receive identification and location information of all devices, vehicles, or entities within the peer-to-peer communication zone 310 every second.

The surrounding identification module 910 can identify the first-vehicle location 218 of FIG. 2A for locating the first vehicle 216 of FIG. 2A. The surrounding identification module 910 can locate the first vehicle 216 by obtaining the current coordinates, such as GPS or longitude-latitude coordinates. The surrounding identification module can assign the coordinates of the first vehicle 216 as the first-vehicle location 218.

The surrounding identification module 910 can also locate the first vehicle 216 by tracking the acceleration 210 of the first vehicle 216, calculating the displacement of the first vehicle 216, and adding the displacement to a previously known location. The resulting location can be assigned as the first-vehicle location 218.

The surrounding identification module 910 can determine that the first vehicle 216 is traveling behind the user by comparing the coordinates of the first device 102 and the lane 206 that the user is travelling in to the first-vehicle location 218. The surrounding identification module 910 can determine that the first vehicle 216 is traveling behind the user if the first-vehicle location 218 is within the lane 206 that is occupied by the first device 102 and is located behind the device-location 208 relative to the direction of travel.

The surrounding identification module 910 can determine whether the first vehicle 216 is behind the user when the first vehicle 216 is within the peer-to-peer communication zone 310. The surrounding identification module 910 can compare the first-vehicle location 218 to the peer-to-peer communication zone 310. The surrounding identification module 910 can determine whether the first vehicle 216 is behind the user when the first-vehicle location 218 is within the peer-to-peer communication zone 310.

The surrounding identification module 910 can identify the second-vehicle location 222 of FIG. 2A for locating the second vehicle 220 of FIG. 2A within a predetermined area relative to the device-location 208. The second-vehicle location 222 of the second vehicle 220 can be identified in the same way as the determination of the first-vehicle location 218 for the first vehicle 216. The surrounding identification module 910 can assign the acceleration 210 of the device or vehicle identified to be the second vehicle 220 as the second-vehicle movement 224 of FIG. 2A.

The surrounding identification module 910 can have the predetermined area, relative to the device-location 208, for evaluating the second-vehicle location 222. The surrounding identification module 910 can have the area for locating the second vehicle 220 predetermined by the user, the software manufacturer, the navigation system 100, or a combination thereof.

The navigation system 100, user, the software manufacturer, or a combination thereof can define the geographical region for evaluating the second-vehicle location 222. The navigation system 100, the user, or the software manufacturer can define the geographical region by defining a radius for identifying the second vehicle 220. For example, if the geographical region is defined by a radius of 20 feet, the navigation system 100 can display warnings based on the second-vehicle movement 224 if the second-vehicle location 222 is 20 feet from the device-location 208 or closer.

The geographical region can also be defined using lateral and parallel distance limits. For example, the geographical region can be defined as 24 feet either side of the first device 102 and 26 feet to the front and to the back of the first device 102. Also, for example, the geographical region can be defined as two lanes to either side and two car lengths front and back of the first device 102.

The surrounding identification module 910 can use the first control unit 712, the second control unit 734, the first communication unit 716, the second communication unit 736, the location unit 720, or a combination thereof to identify, locate, and track the movements of the devices or vehicles surrounding the first device 102. The surrounding identification module 910 can use the first storage unit 714, the second storage unit 746, or a combination thereof to store the identification, the location and the movements of the devices or vehicles surrounding the first device 102.

For illustrative purposes, the navigation system 100 is described as identifying the travel sequence 516 first then determining the lane-level granularity movement 213. However, it is understood that the navigation system 100 can operated differently and that each of the modules can operate individually and independently of the other modules.

For example, the movement determination module 812 can employ a buffer for each of the lane-level granularity movement 213 instead of using the travel sequence 516. The movement determination module 812 can compare the travel state 402 to the first available state in the sequences each defining the lane-level granularity movement 213.

If one or more of the slots in the buffer is filled, the comparison can be made to the next available state. If the state does not match, the movement determination module 812 can reset that buffer and clear out the content. When the state in the sequence matches the travel state 402, the movement determination module 812 can check the first slot as being satisfied.

When the travel state 402 changes, the movement determination module 812 can check the first available slot in each sequence, which defines the lane-level granularity movement 213. The movement determination module 812 can determine the lane-level granularity movement 213 when the buffer is all filled for a specific instance, such as the lane-change 214.

The navigation system 100 can be partitioned between the first device 102 of FIG. 7 and the second device 106 of FIG. 7. For example, the navigation system 100 can be partition into the functional units of the first device 102, the second device 106, or a combination thereof. The current location module 802 and the normalization module 804 can be on the first device 102 and the state guideline module 810 and the movement determination module 812 can be on the second device 106.

The navigation system 100 can also be implemented as additional functional units in the first device 102, the second device 106, or a combination thereof. For example, the movement determination module 812 can be an additional functional unit in the first device 102 and the sequence module 808 can be additional functional unit in the second device 106.

The physical transformation of the lane 206, such as a merge or lane closure due to road construction, results in movement in the physical world, such as the acceleration 210 and the travel path 212, based on the operation of the navigation system 100. The movement of people and entities in the real world can be fed back to the navigation system 100 to further operate the navigation system 100 to guide the user.

For example, the device-location 208 can be used to guide the user to make the lane-change 214 necessary to take the appropriate exit when different lanes lead to different exits. Also, for example, the movement of the second vehicle 220 can be used to guide the user away from the simultaneous merge 306 situations and avoid traffic accidents.

It has been discovered that the present invention provided the navigation system 100 that provide improved accuracy for locating and routing users. The determination of the lane-level granularity movement 213 can be used to calculate the device-location 208 with more precision than the available methods using only the GPS coordinates. The determination of the lane-level granularity movement 213 can detect movements such as the lane-change 214 and sudden stops that GPS based systems were not able to distinguish. The determination of the lane-level granularity movement 213 can allow the navigation system to guide the user with more precision and detail. For example, the improvement in accuracy can allow the navigation system 100 inform the user to make the lane-change 214 necessary to avoid the traffic accident 302 ahead or to take the desired exit.

It has also been discovered that the present invention provided the navigation system 100 that provide improved tracking of the user's movements. The travel state 402 can categorize the different actions the user can take while moving. The transition of the travel state 402 and the determination of the lane-level granularity movement 213 can quantify the actions of the user. The categorization and quantification of the user's movement allows for improved accuracy in tracking the user's movements as compared to using only the GPS coordinates.

It has further been discovered that the present invention provided the navigation system 100 that provide improved safety for the user. The calculation of the travel path 212 and the determination of the lane-level granularity movement 213 can track the movement of the user within the lane 206. The calculation of the travel path 212 and the determination of the lane-level granularity movement 213 can be used to set the status of the user and provide warnings, which can lessen the likelihood and severity of traffic accidents.

It has yet further been discovered that the present invention provided the navigation system 100 that provide less power consumption of the first device 102. Tracking the user, identifying the device-location 208, and calculating the movement displacement 304 without relying on GPS or other external location signals lessens the use of the antenna and transmitter in the first communication unit 716. The decrease in signal detection and transmission lowers the power consumption, which increases the time the first device 102 can operate before requiring a battery charge.

It has yet further been discovered that the present invention provided the navigation system 100 that provide more reliability by continuously supplying the user with location information. Determining the lane-level granularity movement 213 allows the navigation system 100 to track the device-location 208 accurately where the GPS signals are not available or reliable due to multipath and signal blockage. The determination of the lane-level granularity movement 213 can prevent the device-location 208 from jumping or drifting off thereby increasing reliability of the positional information.

Thus, it has been discovered that the navigation system with lane-level mechanism of the present invention furnishes important and heretofore unknown and unavailable solutions, capabilities, and functional aspects for locating relevant contacts.

Moreover, the modules described above can be implemented in hardware and should be considered as hardware functional units in addition to those described in FIGS. 7A and 7B, embedded into the functional units described in FIGS. 7A and 7B, or a combination thereof. For the purposes of this application, the modules are hardware implementation when claimed in apparatus claims.

Figure 10:
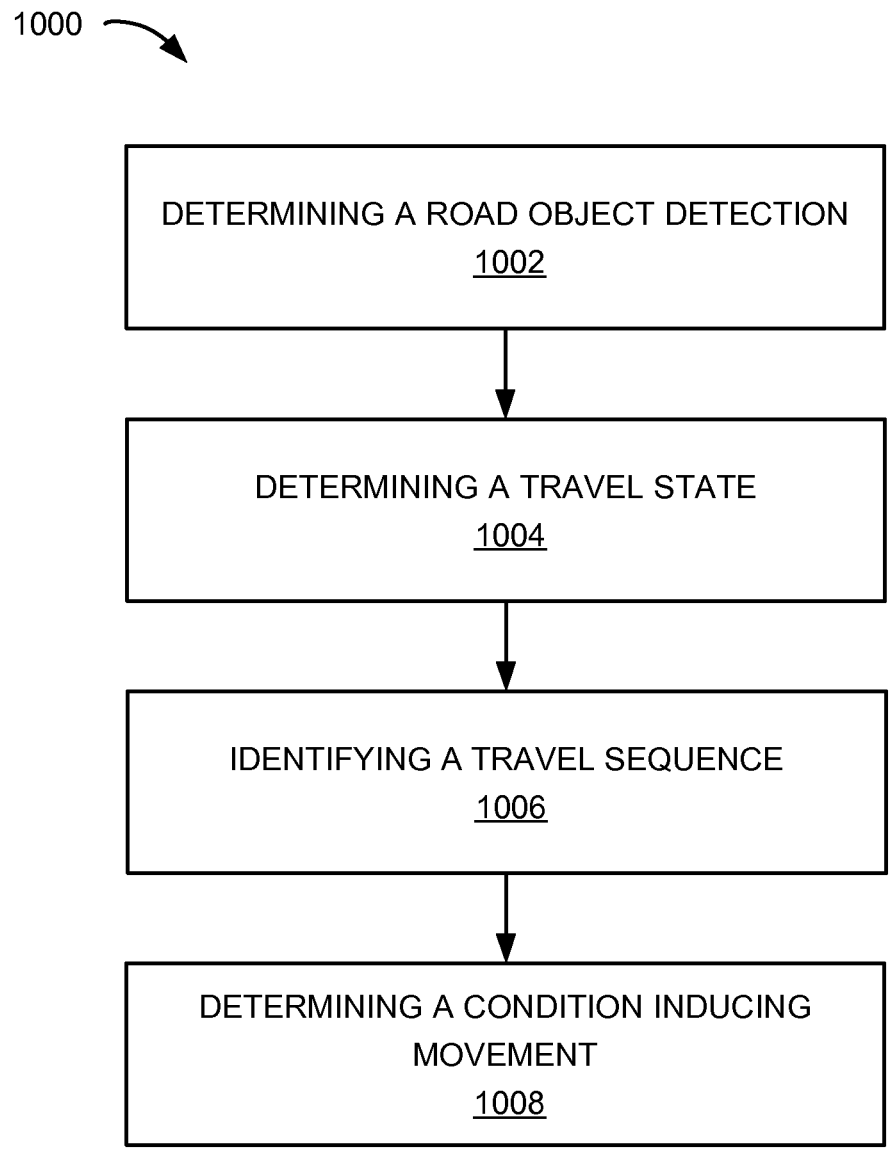
FIG. 10 is a flow chart of a method of operation of the navigation system in a further embodiment of the present invention.

Referring now to FIG. 10, therein is shown a flow chart of a method 1000 of operation of the navigation system 100 in a further embodiment of the present invention. The method 1000 includes: determining a road object detection for monitoring a movement of a device in a block 1002; determining a travel state based on the road object detection in a block 1004; identifying a travel sequence involving the travel state in a block 1006; and determining a condition inducing movement based on matching the travel sequence to a predetermined sequence for displaying on the device in a block 1008.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    determining a road object detection for monitoring a movement of a device;
    determining a travel state with a control unit based on the road object detection;
    identifying a travel sequence involving the travel state; and
    determining a condition inducing movement based on matching the travel sequence to a predetermined sequence including a lane-level granularity movement for displaying on the device.

2. The method as claimed in claim 1 further comprising setting the condition inducing movement as the predetermined sequence of the travel state.

3. The method as claimed in claim 1 wherein determining the condition inducing movement includes matching the road object detection to the predetermined sequence for identifying a road object.

4. The method as claimed in claim 1 wherein determining the road object detection includes determining the road object detection based on detecting an acceleration, a rise count, a drop count, or a combination thereof for identifying a road object.

5. The method as claimed in claim 1 further comprising generating an object profile based on detecting an acceleration, a rise count, a drop count, or a combination thereof for identifying a road object.

6. A method of operation of a navigation system comprising:
    determining a road object detection for monitoring a movement of a device for identifying a road object;
    determining a travel state with a control unit based on a road object detection;
    identifying a travel sequence involving the travel state;
    setting a condition inducing movement as a predetermined sequence of the travel state; and
    determining the condition inducing movement based on matching the travel sequence to the predetermined sequence including a lane-level granularity movement for displaying on the device.

7. The method as claimed in claim 6 wherein determining the condition inducing movement includes determining the road object detection based on matching an acceleration to an object profile for identifying the road object.

8. The method as claimed in claim 6 wherein determining the condition inducing movement includes determining the road object detection based on matching a rise count to an object profile for identifying the road object.

9. The method as claimed in claim 6 wherein determining the condition inducing movement includes determining the road object detection based on matching a drop count to an object profile for identifying the road object.

10. The method as claimed in claim 6 further comprising updating an object profile based on an acceleration, a rise count, a drop count, or a combination thereof for identifying the road object.

11. A navigation system comprising:
    a detecting sensor for determining a road object detection for monitoring a movement of a device;
    a control unit, coupled to the detecting sensor, for:
        determining a travel state based on the road object detection,
        identifying a travel sequence involving the travel state, and
        determining a condition inducing movement based on matching the travel sequence to a predetermined sequence including a lane-level granularity movement for displaying on the device.

12. The system as claimed in claim 11 wherein the control unit is for setting the condition inducing movement as the predetermined sequence of the travel state.

13. The system as claimed in claim 11 wherein the control unit is for matching the road object detection to the predetermined sequence for identifying a road object.

14. The system as claimed in claim 11 wherein the detecting sensor is for determining the road object detection based on detecting an acceleration, a rise count, a drop count, or a combination thereof for identifying a road object.

15. The system as claimed in claim 11 wherein the control unit is for generating an object profile based on detecting an acceleration, a rise count, a drop count, or a combination thereof for identifying a road object.

16. The system as claimed in claim 11 wherein the detecting sensor is for determining a road object detection for monitoring a movement of a device for identifying a road object.

17. The system as claimed in claim 16 wherein the control unit is for determining the road object detection based on matching an acceleration to an object profile for identifying the road object.

18. The system as claimed in claim 16 wherein the control unit is for determining the road object detection based on matching a rise count to an object profile for identifying the road object.

19. The system as claimed in claim 16 wherein the control unit is for determining the road object detection based on matching a drop count to an object profile for identifying the road object.

20. The system as claimed in claim 16 wherein the control unit is for updating an object profile based on an acceleration, a rise count, a drop count, or a combination thereof for identifying the road object.

\* \* \* \* \*